United States Patent
Couillard et al.

(10) Patent No.: US 11,423,816 B2
(45) Date of Patent: Aug. 23, 2022

(54) DYNAMICALLY ADJUSTABLE DISPLAY SYSTEM AND METHODS OF DYNAMICALLY ADJUSTING A DISPLAY

(71) Applicant: CORNING INCORPORATED, Corning, NY (US)

(72) Inventors: James Gregory Couillard, Ithaca, NY (US); Kevin Thomas Gahagan, Painted Post, NY (US); James Joseph Kornacki, Dearborn, MI (US); Cheng-Chung Li, Snohomish, WA (US); Paul George Rickerl, Endicott, NY (US); Yawei Sun, Elmira, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/295,507

(22) PCT Filed: Nov. 19, 2019

(86) PCT No.: PCT/US2019/062127
§ 371 (c)(1),
(2) Date: May 20, 2021

(87) PCT Pub. No.: WO2020/112433
PCT Pub. Date: Jun. 4, 2020

(65) Prior Publication Data
US 2022/0020304 A1 Jan. 20, 2022

Related U.S. Application Data

(60) Provisional application No. 62/772,871, filed on Nov. 29, 2018.

(51) Int. Cl.
*G09G 3/00* (2006.01)
*B60K 35/00* (2006.01)
*G09G 3/3208* (2016.01)

(52) U.S. Cl.
CPC ............. *G09G 3/03* (2020.08); *B60K 35/00* (2013.01); *G09G 3/035* (2020.08); *G09G 3/3208* (2013.01);
(Continued)

(58) Field of Classification Search
CPC ............. G09G 3/035; G09G 3/3208; G09G 2360/144; G09G 2380/02; G09G 2380/10;
(Continued)

(56) References Cited

U.S. PATENT DOCUMENTS

| 4,455,338 A | 6/1984 | Henne |
| 4,899,507 A | 2/1990 | Mairlot |

(Continued)

FOREIGN PATENT DOCUMENTS

| CN | 102566841 A | 7/2012 |
| CN | 203825589 U | 9/2014 |

(Continued)

OTHER PUBLICATIONS

"Standard Test Method for Measurement of Glass Stress-Optical Coefficient", In ASTM standard C770-98, 2013.
(Continued)

*Primary Examiner* — Richard J Hong
(74) *Attorney, Agent, or Firm* — William M. Johnson

(57) ABSTRACT

Dynamically adjustable display systems for adjusting the position of a flexible display in response to ambient light. The display system includes a flexible display that is capable of reversibly bending along one or more bending axes. The display system further includes an adjustable support on which the flexible display is mounted, the adjustable support being able to selectively bend the flexible display. The display system includes photodetectors for detecting ambient light. The photodetectors may be positioned about a
(Continued)

perimeter of the flexible display. A control unit in communication with the adjustable support and the plurality of photodetectors may cause the adjustable support to bend the flexible display in response to ambient light detected at the plurality of photodetectors.

19 Claims, 10 Drawing Sheets

(52) U.S. Cl.
CPC .. *B60K 2370/1533* (2019.05); *B60K 2370/37* (2019.05); *B60K 2370/691* (2019.05); *B60K 2370/741* (2019.05); *G09G 2360/144* (2013.01); *G09G 2380/02* (2013.01); *G09G 2380/10* (2013.01)

(58) Field of Classification Search
CPC .............. B60K 35/00; B60K 2370/691; B60K 2370/741; B60K 2370/1533; B60K 2370/37; B60K 37/02; G05D 15/01; G06F 3/045; H01L 27/3225; B60R 1/00; B32B 17/10146; H01J 29/96
See application file for complete search history.

(56) References Cited

U.S. PATENT DOCUMENTS

| | | |
|---|---|---|
| 4,985,099 A | 1/1991 | Mertens et al. |
| 6,086,983 A | 7/2000 | Yoshizawa |
| 6,332,690 B1 | 12/2001 | Murofushi |
| 6,448,893 B1 | 9/2002 | Dobberkau et al. |
| 6,582,799 B1 | 6/2003 | Brown et al. |
| 6,720,937 B1 * | 4/2004 | Neugart ................. B60K 37/02 345/1.1 |
| 6,756,966 B2 | 6/2004 | Dirksen et al. |
| 7,375,782 B2 | 5/2008 | Yamazaki et al. |
| 8,300,036 B2 | 10/2012 | Shirbabadi |
| 8,344,369 B2 | 1/2013 | Yamazaki et al. |
| 8,549,885 B2 | 10/2013 | Dannoux et al. |
| 8,610,118 B2 | 12/2013 | Yamazaki et al. |
| 8,833,106 B2 | 9/2014 | Dannoux et al. |
| 8,912,447 B2 | 12/2014 | Leong et al. |
| 9,061,934 B2 | 6/2015 | Bisson et al. |
| 9,268,163 B2 | 2/2016 | Park |
| 9,431,630 B2 | 8/2016 | Huang et al. |
| 9,516,743 B2 | 12/2016 | Kim et al. |
| 9,593,042 B2 | 3/2017 | Hu et al. |
| 9,661,114 B2 | 5/2017 | Jeong et al. |
| 9,704,932 B2 | 7/2017 | Lee et al. |
| 9,731,602 B2 | 8/2017 | Kim et al. |
| 9,802,485 B2 | 10/2017 | Masuda et al. |
| 9,858,848 B1 | 1/2018 | Bhageria et al. |
| 9,895,975 B2 | 2/2018 | Lee et al. |
| 9,902,640 B2 | 2/2018 | Dannoux et al. |
| 9,931,817 B2 | 4/2018 | Rickerl |
| 10,131,118 B2 | 11/2018 | Kang et al. |
| 2007/0223121 A1 | 9/2007 | Franck et al. |
| 2008/0203279 A1 * | 8/2008 | Kobashi .................. H01J 29/96 250/216 |
| 2009/0179840 A1 | 7/2009 | Tanaka et al. |
| 2009/0185127 A1 | 7/2009 | Tanaka et al. |
| 2010/0031590 A1 | 2/2010 | Buchwald et al. |
| 2012/0202030 A1 | 8/2012 | Kondo et al. |
| 2013/0088441 A1 | 4/2013 | Chung et al. |
| 2013/0271352 A1 | 10/2013 | Wu et al. |
| 2014/0036428 A1 | 2/2014 | Seng et al. |
| 2014/0098075 A1 * | 4/2014 | Kwak ....................... G06F 3/045 345/204 |
| 2014/0204509 A1 * | 7/2014 | Park ........................ G05D 15/01 361/679.01 |
| 2015/0246507 A1 | 9/2015 | Brown et al. |
| 2016/0207290 A1 * | 7/2016 | Cleary ............. B32B 17/10146 |
| 2016/0297176 A1 | 10/2016 | Rickerl |
| 2016/0306451 A1 | 10/2016 | Isoda et al. |
| 2016/0375808 A1 | 12/2016 | Etienne et al. |
| 2017/0008377 A1 | 1/2017 | Fisher et al. |
| 2017/0021661 A1 | 1/2017 | Pelucchi |
| 2017/0092884 A1 | 3/2017 | Zhang et al. |
| 2017/0168613 A1 | 6/2017 | Hsieh et al. |
| 2017/0168643 A1 | 6/2017 | Wang et al. |
| 2017/0327402 A1 | 11/2017 | Fujii et al. |
| 2017/0349473 A1 | 12/2017 | Moriya et al. |
| 2018/0018870 A1 | 1/2018 | Sehra et al. |
| 2018/0050948 A1 | 2/2018 | Faik et al. |
| 2018/0111569 A1 | 4/2018 | Faik et al. |
| 2018/0147985 A1 | 5/2018 | Brown et al. |
| 2018/0149777 A1 | 5/2018 | Brown |
| 2018/0149907 A1 | 5/2018 | Gahagan et al. |
| 2018/0188869 A1 | 7/2018 | Boggs et al. |
| 2018/0210118 A1 | 7/2018 | Gollier et al. |
| 2018/0245125 A1 | 8/2018 | Tsai et al. |
| 2018/0262719 A1 * | 9/2018 | Jo ............................ B60R 1/00 |
| 2019/0213978 A1 * | 7/2019 | Jia ...................... H01L 27/3225 |

FOREIGN PATENT DOCUMENTS

| | | |
|---|---|---|
| CN | 104679341 A | 6/2015 |
| CN | 204463066 U | 7/2015 |
| CN | 104843976 A | 8/2015 |
| CN | 105511127 A | 4/2016 |
| CN | 108228070 A | 6/2018 |
| DE | 4415878 A1 | 11/1995 |
| DE | 102004022008 A1 | 12/2004 |
| DE | 102013214108 A1 | 2/2015 |
| EP | 0883521 A1 | 12/1998 |
| EP | 3040230 A1 | 7/2016 |
| FR | 2918411 A1 | 1/2009 |
| GB | 2011316 A | 7/1979 |
| JP | 3059337 U | 6/1991 |
| JP | 11-060293 A | 3/1999 |
| JP | 2003-500260 A | 1/2003 |
| JP | 2013-084269 A | 5/2013 |
| JP | 2015-092422 A | 5/2015 |
| JP | 5748082 B2 | 7/2015 |
| JP | 2016-031696 A | 3/2016 |
| JP | 5976561 B2 | 8/2016 |
| JP | 2016-173794 A | 9/2016 |
| JP | 2016-203609 A | 12/2016 |
| JP | 2016-207200 A | 12/2016 |
| KR | 10-2016-0144008 A | 12/2016 |
| WO | 97/31803 A1 | 9/1997 |
| WO | 98/01649 A1 | 1/1998 |
| WO | 2000/073062 A1 | 12/2000 |
| WO | 2007/108861 A1 | 9/2007 |
| WO | 2012/058084 A2 | 5/2012 |
| WO | 2014/175371 A1 | 10/2014 |
| WO | 2015/031594 A2 | 3/2015 |
| WO | 2016/044360 A1 | 3/2016 |
| WO | 2016/125713 A1 | 8/2016 |
| WO | 2016/136758 A1 | 9/2016 |
| WO | 2016/196531 A1 | 12/2016 |
| WO | 2016/196546 A1 | 12/2016 |
| WO | 2017/155932 A1 | 9/2017 |
| WO | 2018/005646 A1 | 1/2018 |
| WO | 2018/009504 A1 | 1/2018 |
| WO | 2018/075853 A1 | 4/2018 |
| WO | 2018/081068 A1 | 5/2018 |
| WO | 2018/125683 A1 | 7/2018 |

OTHER PUBLICATIONS

ASTM procedure D5767 (ASTM 5767), entitled "Standard Test Methods for Instrumental Measurements of Distinctness-of-Image Gloss of Coating Surfaces".
ASTM C1422/C1422M-10 "Standard Specification for Chemically Strengthened Flat Glass".
Audi Prologue Interior Design | AutoMotoTV . See video: https://www.youtube.com/watch?v=fbNKQU5OjYs.
International Search Report and Written Opinion of the Interna-

(56) References Cited

OTHER PUBLICATIONS tional Searching Authority; PCT/US2018/012215 dated Aug. 1, 2018; 21 Pgs; European Patent Office.
International Search Report and Written Opinion of the International Searching Authority; PCT/US2018/041062 dated Nov. 13, 2018; 15 Pgs; European Patent Office.
ISR and Written Opinion PCT/US2019/062127.
International Search Report and Written Opinion of the International Searching Authority; PCT/US19/62127; dated Mar. 25, 2020; 21 Pages; European Patent Office.

* cited by examiner

DYNAMICALLY ADJUSTABLE DISPLAY SYSTEM AND METHODS OF DYNAMICALLY ADJUSTING A DISPLAY

CROSS-REFERENCE TO RELATED APPLICATIONS

This application is a national stage application under 35 U.S.C. § 371 of International Application No. PCT/US2019/062127 filed on Nov. 19, 2019, which claims the benefit of priority under 35 U.S.C. § 119 of U.S. Provisional Application Ser. No. 62/772,871 filed on Nov. 29, 2018 the content of which is relied upon and incorporated herein by reference in its entirety.

FIELD

Embodiments described herein generally relate to systems and methods for adjusting a display. Specifically, embodiments described herein relate to display systems that are dynamically adjustable in response to ambient lighting conditions.

BACKGROUND

Electronic displays are commonly used in various applications including in televisions, computers, electronic tablets, cell phones, vehicle displays, automated teller machines, self-checkout stations at grocery stores or restaurants, check-in stations at hotels or airports, among numerous other applications. The media displayed on these electronic displays, such as text, photos, and/or video, can become difficult to see depending upon the ambient lighting conditions. For example, it can become difficult for a driver of a vehicle to see a vehicle display while driving in an area with bright light. A vehicle passenger may also have difficulty viewing an electronic display if the ambient light is too bright. The inability to view a vehicle display or other electronic display can be frustrating and inconvenient, and the user may be without remedy.

Accordingly, there is a need in the art for a display system that can dynamically adjust without intervention by the user in response to ambient lighting conditions to improve visibility of media on an electronic display.

BRIEF SUMMARY OF THE INVENTION

In a first aspect, a dynamically adjustable display system is described, the dynamically adjustable display system including a flexible display that is capable of reversibly bending along one or more bending axes, an adjustable support on which the flexible display is mounted, wherein the adjustable support is configured to selectively bend the flexible display, a plurality of photodetectors positioned about a perimeter of the flexible display for detecting ambient light, and a control unit in communication with the adjustable support and the plurality of photodetectors, wherein the control unit causes the adjustable support to bend the flexible display in response to ambient light detected at the plurality of photodetectors.

In a second aspect, the dynamically adjustable display system according to aspects of the preceding paragraph may include a flexible display that includes a cold-bent glass substrate. In some embodiments, the flexible display may further include a display module attached to a surface of the cold-bent glass substrate. In some embodiments, the display module may include a second glass substrate and a backlight unit, where the second glass substrate is disposed adjacent to the cold-bent glass substrate and between the backlight unit and the cold-bent glass substrate. In some embodiments, the display module may include an organic light emitting diode display.

In a third aspect, the dynamically adjustable display system according to aspects of the preceding paragraphs may include a flexible display with a border positioned on and extending along the perimeter of the flexible display, where the plurality of photodetectors are positioned on the border.

In a fourth aspect, the dynamically adjustable display system according to aspects of the preceding paragraphs may include a control unit configured to determine a bending direction and a bending degree based upon ambient light detected at the plurality of photodetectors.

In a fifth aspect, the dynamically adjustable display system according to aspects of the preceding paragraphs may include a flexible display capable of bending into a concave configuration or a convex configuration.

In a sixth aspect, the dynamically adjustable display system according to aspects of the preceding paragraphs may include an adjustable support including one or more mechanical actuators configured to selectively bend the flexible display.

In a seventh aspect, the dynamically adjustable display system according to aspects of the preceding paragraphs may include a control unit configured to cause the adjustable support to bend the flexible display so as to reduce an intensity of ambient light detected by at least one of the plurality of photodetectors.

In an eighth aspect, the dynamically adjustable display system according to aspects of the preceding paragraphs may include one or more location sensors configured to detect a location of a user, and the control unit further causes the adjustable support to adjust the flexible display based on the location of the user. In some embodiments, the control unit is configured to adjust the flexible display so as to orient the flexible display towards the location of the user as determined by the one or more location sensors.

In a ninth aspect, a method for dynamically adjusting a flexible display is described, the method including detecting an intensity of ambient light at each of a plurality of photodetectors, wherein the plurality of photodetectors are positioned about a perimeter of a flexible display; and bending the flexible display based upon the intensity of ambient light detected at the plurality of photodetectors so as to reduce the intensity of ambient light detected by at least one of the plurality of photodetectors.

In a tenth aspect, the method according to aspects of the preceding paragraph may include determining a bending direction in which to bend the flexible display based upon the intensity of ambient light detected at each of the plurality of photodetectors.

In an eleventh aspect, the method according to aspects of either of the two preceding paragraphs may include determining a bending degree to which to bend the flexible display based upon the intensity of ambient light detected at the plurality of photodetectors.

In a twelfth aspect, the method according to aspects of any of the three preceding paragraphs may include tilting the flexible display based upon the intensity of ambient light detected at the plurality of photodetectors so as to reduce the intensity of ambient light detected by at least one of the plurality of photodetectors.

In a thirteenth aspect, the method according to aspects of any of the four preceding paragraphs may include bending the flexible display based upon a location of a user as determined by one or more location sensors.

In a fourteenth aspect, a vehicle display system for dynamically adjusting a flexible display based upon ambient lighting conditions is described, the vehicle display system including a vehicle base; an adjustable support disposed on the vehicle base, a flexible display mounted on the adjustable support such that a rear surface of the flexible display is in contact with the adjustable support and a front surface of the flexible display allows for an image on the flexible display to be viewed by a user; a plurality of photodetectors positioned about a perimeter of the flexible display for detecting ambient light; and a control unit in communication with the adjustable support and the plurality of photodetectors, wherein the control unit receives ambient light information from the plurality of photodetectors and causes the adjustable support to bend the flexible display in response to the ambient light information.

In a fifteenth aspect, the vehicle display system according to aspects of the preceding paragraph may include a vehicle base that is any one of a center console, a dashboard, or a steering wheel.

In a sixteenth aspect, the vehicle display system according to aspects of either of the two preceding paragraphs may include a flexible display that includes a display module attached to a surface of a cold-bent glass substrate.

BRIEF DESCRIPTION OF THE DRAWINGS/FIGURES

DETAILED DESCRIPTION OF THE INVENTION

The present invention(s) will now be described in detail with reference to embodiments thereof as illustrated in the accompanying drawings. References to "one embodiment," "an embodiment," "an exemplary embodiment," etc., indicate that the embodiment described may include a particular feature, structure, or characteristic, but every embodiment may not necessarily include the particular feature, structure or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Electronic displays are often used outdoors or in other areas of bright light. Bright light from a light source, such as the sun, street lights, or the like can make it difficult to view media displayed on the electronic display. The bright ambient light may wash out the display and/or may produce a glare. As a result, a user may be unable to view the media displayed on the electronic display or may only be able to view the media partially. In order to properly view the electronic display, the user may have to manually adjust the position of the display or may have to move to a different location. Manually adjusting the position of the display can be inconvenient and troublesome for the user.

In some cases, the user may be unable to reposition the display or move the display to improve visibility of the media thereon. For example, in the case of a vehicle display, the display may be fixed in position on the vehicle so that it cannot be adjusted. As a result, the user may simply be unable to see the electronic display until the ambient lighting conditions change. This may be particularly problematic when driving a vehicle, as the electronic display in the vehicle may provide important information such as navigation information, traffic information, and vehicle systems information. It may be frustrating and inconvenient for the user to be unable to interact efficiently with the display and view important information.

Embodiments herein relate to display systems that are dynamically adjustable in response to ambient lighting conditions. The display systems include a flexible display capable of dynamically bending in a reversible manner. In some embodiments, the flexible display may include a glass substrate. In some embodiments, the flexible display includes a cold-bent glass substrate. U.S. Patent Application Publication 2018/018870, published on Jul. 5, 2018, and incorporated herein by reference in its entirety, discloses cold-bent glass substrates according to some embodiments, flexible displays including cold-bent glass substrates according to some embodiments, and methods for forming the same.

Cold-Bent Glass

Figure 1:
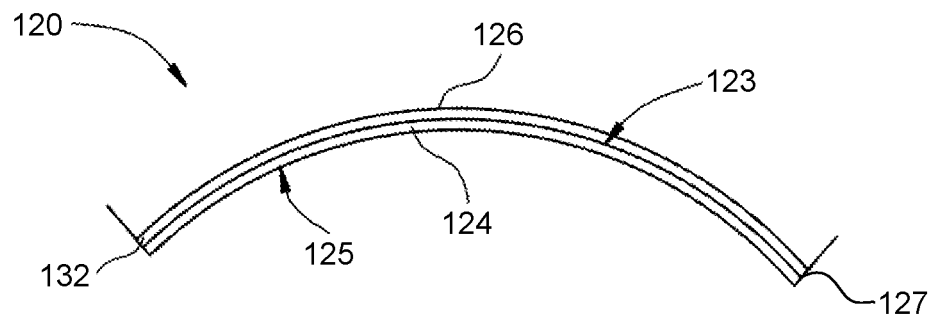
FIG. 1 is a side view of a flexible display including a curved glass substrate and a curved display module according to some embodiments.

FIG. 1 illustrates a flexible display 120 including a glass substrate 124 and a display module 126 according to some embodiments. Glass substrate 124 may be disposed on a top, user-facing surface of display module 126. In such embodiments, glass substrate 124 may be a cover glass substrate. As used herein, the terms "top surface" or "topmost surface," and "bottom surface" or "bottommost surface" reference the top and bottom surface of a layer, component, or article as is would be oriented during its normal and intended use with the top surface being the user-facing surface. For example, when incorporated into a consumer electronic product having an electronic display, the "top surface" of an article, layer, or component refers to the top surface of that article, layer, or component as it would be oriented when the electronic display is being viewed through the article, component, or layer.

As used herein the term "glass substrate" is used in its broadest sense to include any object made wholly or partly of glass. Glass substrates include laminates of glass and non-glass materials, laminates of glass and crystalline materials, and glass-ceramics (including an amorphous phase and a crystalline phase). The glass substrate may be transparent or opaque. In one or more embodiments, the glass substrate may include a colorant that provides a specific color.

As used herein, the terms "cold-bent," or "cold-bending" refer to curving the glass substrate at a cold-bend temperature which is less than the softening point of the glass (as described herein). The term "cold-bendable" refers to the capability of a glass substrate to be cold-bent. A feature of a cold-bent glass substrate is asymmetric surface compressive stress between the first major surface 123 and the second major surface 125. A minor surface 127 connects the first major surface 123 and the second major surface 125, as shown in FIG. 1. In some embodiments, second major surface 125 may be a user-facing, top surface of glass substrate 124. In some embodiments, first major surface 123 may be a bottom surface of glass substrate 124.

In one or more embodiments, prior to the cold-bending process or being cold-bent, the respective compressive stresses in the first major surface 123 and the second major surface 125 of the glass substrate 124 are substantially equal. In one or more embodiments in which the glass substrate 124 is unstrengthened, the first major surface 123 and the second major surface 125 exhibit no appreciable compressive stress, prior to cold-bending. In one or more embodiments in which the glass substrate 124 is strengthened (as described herein), the first major surface 123 and the second major surface 125 exhibit substantially equal compressive stress with respect to one another, prior to cold-bending. In one or more embodiments, after cold-bending (shown, for example, in FIGS. 1 and 6, the compressive stress on the surface having a concave shape after bending (e.g., first major surface 123 in FIGS. 1 and 6) increases. In other words, the compressive stress on the concave surface (e.g., first major surface 123) is greater after cold-bending than before cold-bending. Without being bound by theory, the cold-bending process increases the compressive stress of the glass substrate being shaped to compensate for tensile stresses imparted during bending and/or forming operations. In one or more embodiments, the cold-bending process causes the concave surface (first major surface 123) to experience compressive stresses, while the surface forming a convex shape (i.e., the second major surface 125 in FIGS. 1 and 6) after cold-bending experiences tensile stresses. The tensile stress experienced by the convex (i.e., the second major surface 125) following cold-bending results in a net decrease in surface compressive stress, such that the compressive stress in convex surface (i.e., the second major surface 125) of a strengthened glass substrate following cold-bending is less than the compressive stress on the same surface (i.e., second major surface 125) when the glass substrate is flat.

When a strengthened glass substrate is utilized, the first major surface 123 and the second major surface 125 comprise a compressive stress that is substantially equal to one another prior to cold-bending, and thus the first major surface 123 can experience greater tensile stress during cold-bending without risking fracture. This allows for the strengthened glass substrate to conform to more tightly curved surfaces or shapes.

In one or more embodiments, the thickness of the glass substrate 124 is tailored to allow the glass substrate 124 to be more flexible to achieve the desired radius of curvature. Moreover, a thinner glass substrate 124 may deform more readily, which could potentially compensate for shape mismatches and gaps that may be created by the shape of the display module 126 (when curved). In one or more embodiments, a thin and strengthened glass substrate 124 exhibits greater flexibility especially during cold-bending. The greater flexibility of the glass substrates discussed herein may both allow for sufficient degrees of bending to be created via the air pressure-based bending processes as discussed herein and also for consistent bend formation without heating. In one or more embodiments, the glass substrate 124 and at least a portion of the display module 126 have substantially similar radii of curvature to provide a substantially uniform distance between the first major surface 123 and the display module 126 (which may be filled with an adhesive).

In one or more embodiments, the cold-bent glass substrate 124 (and optionally the curved display module 126) may have a compound curve including a major radius and a cross curvature. A complexly curved cold-bent glass substrate 124 (and optionally the curved display module) according to one or more embodiments may have a distinct radius of curvature in two independent directions. According to one or more embodiments, the complexly curved cold-bent glass substrate 124 (and optionally the curved display module) may thus be characterized as having "cross curvature," where the cold-bent glass substrate (and optionally the curved display module) are curved along an axis (i.e., a first axis) that is parallel to a given dimension and also curved along an axis (i.e., a second axis) that is perpendicular to the same dimension. The curvature of the cold-bent glass substrate (and optionally the curved display module) can be even more complex when a significant minimum radius is combined with a significant cross curvature, and/or depth of bend.

Figure 2:
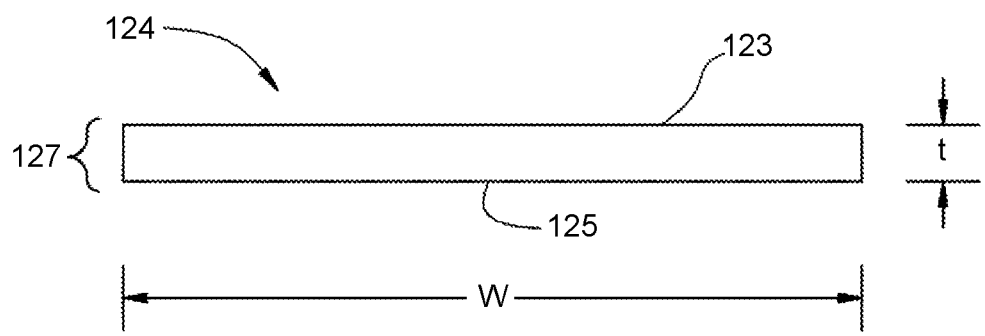
FIG. 2 is a side view of a glass substrate of a flexible display according to some embodiments.

In the embodiment shown, the glass substrate 124 has a thickness (t) that is substantially constant and is defined as a distance between the first major surface 123 and the second major surface 125. The thickness (t) as used herein refers to the maximum thickness of the glass substrate 124. In the embodiment shown in FIGS. 2 and 3, the glass substrate 124 includes a width (W) defined as a first maximum dimension of one of the first or second major surfaces orthogonal to the thickness (t), and a length (L) defined as a second maximum dimension of one of the first or second surfaces orthogonal to both the thickness and the width. In other embodiments, the dimensions discussed herein may be average dimensions.

In one or more embodiments, the glass substrate 124 has a thickness (t) that is about 1.5 mm (millimeters) or less. For example, the thickness may be in a range from about 0.01 mm to about 1.5 mm, 0.02 mm to about 1.5 mm, 0.03 mm to about 1.5 mm, 0.04 mm to about 1.5 mm, 0.05 mm to about 1.5 mm, 0.06 mm to about 1.5 mm, 0.07 mm to about 1.5 mm, 0.08 mm to about 1.5 mm, 0.09 mm to about 1.5 mm, 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.01 mm to about 1.4 mm, from about 0.01 mm to about 1.3 mm, from about 0.01 mm to about 1.2 mm, from about 0.01 mm to about 1.1 mm, from about 0.01 mm to about 1.05 mm, from about 0.01 mm to about 1 mm, from about 0.01 mm to about 0.95 mm, from about 0.01 mm to about 0.9 mm, from about 0.01 mm to about 0.85 mm, from about 0.01 mm to about 0.8 mm, from about 0.01 mm to about 0.75 mm, from about 0.01 mm to about 0.7 mm, from about 0.01 mm to about 0.65 mm, from about 0.01 mm to about 0.6 mm, from about 0.01 mm to about 0.55 mm, from about 0.01 mm to about 0.5 mm, from about 0.01 mm to about 0.4 mm, from about 0.01 mm to about 0.3 mm, from about 0.01 mm to about 0.2 mm, from about 0.01 mm to about 0.1 mm, from about 0.04 mm to about 0.07 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

In one or more embodiments, the glass substrate 124 has a width (W) in a range from about 5 cm (centimeters) to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

In one or more embodiments, the glass substrate has a length (L) in a range from about 5 cm to about 250 cm, from about 10 cm to about 250 cm, from about 15 cm to about 250 cm, from about 20 cm to about 250 cm, from about 25 cm to about 250 cm, from about 30 cm to about 250 cm, from about 35 cm to about 250 cm, from about 40 cm to about 250 cm, from about 45 cm to about 250 cm, from about 50 cm to about 250 cm, from about 55 cm to about 250 cm, from about 60 cm to about 250 cm, from about 65 cm to about 250 cm, from about 70 cm to about 250 cm, from about 75 cm to about 250 cm, from about 80 cm to about 250 cm, from about 85 cm to about 250 cm, from about 90 cm to about 250 cm, from about 95 cm to about 250 cm, from about 100 cm to about 250 cm, from about 110 cm to about 250 cm, from about 120 cm to about 250 cm, from about 130 cm to about 250 cm, from about 140 cm to about 250 cm, from about 150 cm to about 250 cm, from about 5 cm to about 240 cm, from about 5 cm to about 230 cm, from about 5 cm to about 220 cm, from about 5 cm to about 210 cm, from about 5 cm to about 200 cm, from about 5 cm to about 190 cm, from about 5 cm to about 180 cm, from about 5 cm to about 170 cm, from about 5 cm to about 160 cm, from about 5 cm to about 150 cm, from about 5 cm to about 140 cm, from about 5 cm to about 130 cm, from about 5 cm to about 120 cm, from about 5 cm to about 110 cm, from about 5 cm to about 110 cm, from about 5 cm to about 100 cm, from about 5 cm to about 90 cm, from about 5 cm to about 80 cm, or from about 5 cm to about 75 cm.

Strengthened Glass Substrates

In one or more embodiments, the glass substrate 124 may be strengthened. In one or more embodiments, the glass substrate 124 may be strengthened to include compressive stress that extends from a surface to a depth of compression (DOC). The compressive stress regions are balanced by a central portion exhibiting a tensile stress. At the DOC, the stress crosses from a compressive stress to a tensile stress. The compressive stress and the tensile stress are provided herein as absolute values.

In one or more embodiments, the glass substrate 124 may be strengthened mechanically by utilizing a mismatch of the coefficient of thermal expansion between portions of the article to create a compressive stress region and a central region exhibiting a tensile stress. In some embodiments, the glass substrate 124 may be strengthened thermally by heating the glass to a temperature above the glass transition point and then rapidly quenching.

In one or more embodiments, the glass substrate 124 may be chemically strengthened by ion exchange. In the ion exchange process, ions at or near the surface of the glass substrate are replaced by—or exchanged with—larger ions having the same valence or oxidation state. In those embodiments in which the glass substrate 124 comprises an alkali aluminosilicate glass, ions in the surface layer of the article and the larger ions are monovalent alkali metal cations, such as Li+, Na+, K+, Rb+, and Cs+. Alternatively, monovalent cations in the surface layer may be replaced with monovalent cations other than alkali metal cations, such as Ag+ or the like. In such embodiments, the monovalent ions (or cations) exchanged into the glass substrate generate a stress.

Ion exchange processes are typically carried out by immersing a glass substrate 124 in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ion (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath composition may include nitrates, sulfates, and chlorides of the larger alkali metal ion. Typical nitrates include $KNO_3$, $NaNO_3$, $LiNO_3$, and combinations thereof. The temperature of the molten salt bath typically is in a range from about 380° C. up to about 500° C., while immersion times range from about 15 minutes up to about 100 hours depending on glass substrate thickness, bath temperature and glass (or monovalent ion) diffusivity. However, temperatures and immersion times different from those described above may also be used.

In one or more embodiments, the glass substrates may be immersed in a molten salt bath of 100% NaNO$_3$, 100% KNO$_3$, or a combination of NaNO$_3$ and KNO$_3$ having a temperature from about 370° C. to about 480° C. In some embodiments, the glass substrate may be immersed in a molten mixed salt bath including from about 1% to about 99% KNO$_3$ and from about 1% to about 99% NaNO$_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including NaNO$_3$ and KNO$_3$ (e.g., 49%/51%, 50%/50%, 51%/49%) having a temperature less than about 420° C. (e.g., about 400° C. or about 380° C.) for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitude stresses within the glass substrate at different depths). The resulting relative depths of the stress-generating ions can be determined and cause different characteristics of the stress profile.

CS is measured using those means known in the art, such as by surface stress meter using commercially available instruments such as the FSM-6000 (FSM), manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM, by ASTM standard C1422/C1422M-15 entitled "Standard Specification for Chemically Strengthened Flat Glass," or by a scattered light polariscope (SCALP) (such as the SCALP-04 scattered light polariscope available from Glasstress Ltd., located in Tallinn, Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate maybe strengthened to exhibit a DOC that is described a fraction of the thickness (t) of the glass substrate (as described herein). For example, in one or more embodiments, the DOC may be equal to or greater than about 0.05t, equal to or greater than about 0.1t, equal to or greater than about 0.11t, equal to or greater than about 0.12t, equal to or greater than about 0.13t, equal to or greater than about 0.14t, equal to or greater than about 0.15t, equal to or greater than about 0.16t, equal to or greater than about 0.17t, equal to or greater than about 0.18t, equal to or greater than about 0.19t, equal to or greater than about 0.2t, equal to or greater than about 0.21t. In some embodiments, the DOC may be in a range from about 0.08t to about 0.25t, from about 0.09t to about 0.25t, from about 0.18t to about 0.25t, from about 0.11t to about 0.25t, from about 0.12t to about 0.25t, from about 0.13t to about 0.25t, from about 0.14t to about 0.25t, from about 0.15t to about 0.25t, from about 0.08t to about 0.24t, from about 0.08t to about 0.23t, from about 0.08t to about 0.22t, from about 0.08t to about 0.21t, from about 0.08t to about 0.2t, from about 0.08t to about 0.19t, from about 0.08t to about 0.18t, from about 0.08t to about 0.17t, from about 0.08t to about 0.16t, or from about 0.08t to about 0.15t. In some instances, the DOC may be about 20 μm or less. In one or more embodiments, the DOC may be about 20 μm or greater, 30 μm or greater, or 40 μm or greater (e.g., from about 20 μm to about 300 μm, from about 25 μm to about 300 μm, from about 30 μm to about 300 μm, from about 35 μm to about 300 μm, from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 20 μm to about 290 μm, from about 20 μm to about 280 μm, from about 20 μm to about 260 μm, from about 20 μm to about 250 μm, from about 20 μm to about 240 μm, from about 20 μm to about 230 μm, from about 20 μm to about 220 μm, from about 20 μm to about 210 μm, from about 20 μm to about 200 μm, from about 20 μm to about 180 μm, from about 20 μm to about 160 μm, from about 20 μm to about 150 μm, from about 20 μm to about 140 μm, from about 20 μm to about 130 μm, from about 20 μm to about 120 μm, from about 20 μm to about 110 μm, from about 20 μm to about 100 μm, from about 20 μm to about 60 μm, from about 20 μm to about 50 μm, or from about 20 μm to about 40 μm).

In one or more embodiments, the strengthened glass substrate may have a CS (which may be found at the surface or a depth within the glass substrate) of about 200 MPa (megapascals) or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater. In one or more embodiments, the strengthened glass substrate may have a CS (which may be found at the surface or a depth within the glass substrate) from about 200 MPa to about 1050 MPa, from about 250 MPa to about 1050 MPa, from about 300 MPa to about 1050 MPa, from about 350 MPa to about 1050 MPa, from about 400 MPa to about 1050 MPa, from about 450 MPa to about 1050 MPa, from about 500 MPa to about 1050 MPa, from about 550 MPa to about 1050 MPa, from about 600 MPa to about 1050 MPa, from about 200 MPa to about 1000 MPa, from about 200 MPa to about 950 MPa, from about 200 MPa to about 900 MPa, from about 200 MPa to about 850 MPa, from about 200 MPa to about 800 MPa, from about 200 MPa to about 750 MPa, from about 200 MPa to about 700 MPa, from about 200 MPa to about 650 MPa, from about 200 MPa to about 600 MPa, from about 200 MPa to about 550 MPa, or from about 200 MPa to about 500 MPa.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa, from about 50 MPa to about 100 MPa, from about 60 MPa to about 100 MPa, from about 70 MPa to about 100 MPa, from about 80 MPa to about 100 MPa, from about 40 MPa to about 90 MPa, from about 40 MPa to about 80 MPa, from about 40 MPa to about 70 MPa, or from about 40 MPa to about 60 MPa.

In one or more embodiments, the glass substrate comprises a CS of about 900 MPa or greater (e.g., about 1000 MPa), a DOC from about 20 μm to about 40 μm, and a CT of about 20 MPa or greater.

In some embodiments, the strengthened glass substrate exhibits a stress profile along the depth or thickness thereof that exhibits a parabolic-like shape, as described in U.S. Pat. No. 9,593,042, entitled "Glasses and glass ceramics including metal oxide concentration gradient", which is hereby incorporated by reference in its entirety. "Stress profile" refers to the changes in stress from the first major surface to the second major surface. The stress profile may be described in terms of MPa at a given micrometer of thickness or depth from the first major surface or the second major surface. In one or more specific embodiments, the stress profile is substantially free of a flat stress (i.e., compressive or tensile) portion or a portion that exhibits a substantially constant stress (i.e., compressive or tensile). In some embodiments, the region of the glass substrate exhibiting a tensile stress has a stress profile that is substantially free of a flat stress or free of a substantially constant stress. In one or more embodiments, all points of the stress profile between a thickness range from about 0·t up to about 0.2·t and greater than 0.8·t (or from about 0·t to about 0.3·t and greater than 0.7.0 comprise a tangent that is less than about −0.1 MPa/micrometers or greater than about 0.1 MPa/micrometers. In some embodiments, the tangent may be less than about −0.2 MPa/micrometers or greater than about 0.2 MPa/micrometers. In some more specific embodiments, the tangent may be less than about −0.3 MPa/micrometers or greater than about 0.3 MPa/micrometers. In an even more specific embodiment, the tangent may be less than about −0.5 MPa/micrometers or greater than about 0.5 MPa/micrometers. In other words, the stress profile of one or more embodiments along these thickness ranges (i.e., 0·t up to about 2·t and greater than 0.8t, or from about 0t to about 0.3·t and 0.7·t or greater) exclude points having a tangent, as described herein. In contrast, stress profiles that exhibit error function or quasi-linear shapes have points along these thickness ranges (i.e., 0·t up to about 2·t and greater than 0.8·t, or from about 0·t to about 0.3·t and 0.7·t or greater) that have a tangent that is from about −0.1 MPa/micrometers to about 0.1 MPa/micrometers, from about −0.2 MPa/micrometers to about 0.2 MPa/micrometers, from about −0.3 MPa/micrometers to about 0.3 MPa/micrometers, or from about −0.5 MPa/micrometers to about 0.5 MPa/micrometers (indicating a flat or zero slope stress profile along such thickness ranges). The stress profiles of one or more embodiments of this disclosure do not exhibit such a stress profile having a flat or zero slope stress profile along these thickness ranges.

In one or more embodiments, the strengthened glass substrate exhibits a stress profile a thickness range from about 0.1·t to 0.3·t and from about 0.7·t to 0.9·t that comprises a maximum tangent and a minimum tangent. In some instances, the difference between the maximum tangent and the minimum tangent is about 3.5 MPa/micrometers or less, about 3 MPa/micrometers or less, about 2.5 MPa/micrometers or less, or about 2 MPa/micrometers or less.

In one or more embodiments, the stress profile of the strengthened glass substrate may be substantially free of any linear segments that extend in a depth direction or along at least a portion of the thickness t of the glass substrate. In other words, the stress profile is substantially continuously increasing or decreasing along the thickness t. In some embodiments, the stress profile is substantially free of any linear segments in a depth or thickness direction having a length of about 10 micrometers or more, about 50 micrometers or more, or about 100 micrometers or more, or about 200 micrometers or more. As used herein, the term "linear" refers to a slope having a magnitude of less than about 5 MPa/micrometer, or less than about 2 MPa/micrometer along the linear segment. In some embodiments, one or more portions of the stress profile that are substantially free of any linear segments in a depth direction are present at depths within the strengthened glass substrate of about 5 micrometers or greater (e.g., 10 micrometers or greater, or 15 micrometers or greater) from either one or both the first major surface or the second major surface. For example, along a depth or thickness of about 0 micrometers to less than about 5 micrometers from the first surface, the stress profile may include linear segments, but from a depth of about 5 micrometers or greater from the first surface, the stress profile may be substantially free of linear segments.

In some embodiments, the stress profile may include linear segments at depths from about 0t up to about 0.1t and may be substantially free of linear segments at depths of about 0.1t to about 0.4t. In some embodiments, the stress profile from a thickness in the range from about 0t to about 0.1t may have a slope in the range from about 20 MPa/microns to about 200 MPa/microns. As will be described herein, such embodiments may be formed using a single ion-exchange process by which the bath includes two or more alkali salts or is a mixed alkali salt bath or multiple (e.g., 2 or more) ion exchange processes.

In one or more embodiments, the strengthened glass substrate may be described in terms of the shape of the stress profile along the CT region or the region in the glass substrate that exhibits tensile stress. For example, in some embodiments, the stress profile along the CT region (where stress is in tension) may be approximated by equation. In some embodiments, the stress profile along the CT region may be approximated by equation (1):

$$\text{Stress}(x) = \text{MaxCT} - (((\text{MaxCT} \cdot (n+1))/0.5^n) \cdot |(x/t) - 0.5|^n) \quad (1)$$

In equation (1), the stress (x) is the stress value at position x. Here the stress is positive (tension). MaxCT is the maximum central tension as a positive value in MPa. The value x is position along the thickness (t) in micrometers, with a range from 0 to t; x=0 is one surface (i.e., the first major surface or the second major surface), x=0.5t is the center of the glass substrate, stress(x)=MaxCT, and x=t is the opposite surface (i.e., the first major surface or the second major surface). MaxCT used in equation (1) may be in the range from about 50 MPa to about 350 MPa (e.g., 60 MPa to about 300 MPa, or from about 70 MPa to about 270 MPa), and n is a fitting parameter from 1.5 to 5 (e.g., 2 to 4, 2 to 3 or 1.8 to 2.2) whereby n=2 can provide a parabolic stress profile, exponents that deviate from n=2 provide stress profiles with near parabolic stress profiles.

In one or more embodiments, the parabolic-like stress profile is generated due to a non-zero concentration of a metal oxide(s) that varies along a portion of the thickness. The variation in concentration may be referred to herein as a gradient. In some embodiments, the concentration of a metal oxide is non-zero and varies, both along a thickness range from about 0·t to about 0.3·t. In some embodiments, the concentration of the metal oxide is non-zero and varies along a thickness range from about 0·t to about 0.35·t, from about 0·t to about 0.4·t, from about 0·t to about 0.45·t or from about 0·t to about 0.48·t. The metal oxide may be described as generating a stress in the strengthened glass substrate. The variation in concentration may be continuous along the above-referenced thickness ranges. Variation in concentration may include a change in metal oxide concentration of about 0.2 mol % along a thickness segment of about 100 micrometers. This change may be measured by known methods in the art including microprobe. The metal oxide that is non-zero in concentration and varies along a portion of the thickness may be described as generating a stress in the strengthened glass substrate.

The variation in concentration may be continuous along the above-referenced thickness ranges. In some embodiments, the variation in concentration may be continuous along thickness segments in the range from about 10 micrometers to about 30 micrometers. In some embodiments, the concentration of the metal oxide decreases from the first surface to a point between the first surface and the second surface and increases from the point to the second surface.

The concentration of metal oxide may include more than one metal oxide (e.g., a combination of $Na_2O$ and $K_2O$). In some embodiments, where two metal oxides are utilized and where the radius of the ions differ from one or another, the concentration of ions having a larger radius is greater than the concentration of ions having a smaller radius at shallow depths, while the at deeper depths, the concentration of ions having a smaller radius is greater than the concentration of ions having larger radius. For example, where a single Na- and K-containing bath is used in the ion exchange process, the concentration of K+ ions in the strengthened glass substrate is greater than the concentration of Na+ ions at shallower depths, while the concentration of Na+ is greater than the concentration of K+ ions at deeper depths. This is due, in part, due to the size of the ions. In such strengthened glass substrate, the area at or near the surface comprises a greater CS due to the greater amount of larger ions at or near the surface. This greater CS may be exhibited by a stress profile having a steeper slope at or near the surface (i.e., a spike in the stress profile at the surface).

The concentration gradient or variation of one or more metal oxides is created by chemically strengthening the glass substrate, for example, by the ion exchange processes previously described herein, in which a plurality of first metal ions in the glass substrate is exchanged with a plurality of second metal ions. The first ions may be ions of lithium, sodium, potassium, and rubidium. The second metal ions may be ions of one of sodium, potassium, rubidium, and cesium, with the proviso that the second alkali metal ion has an ionic radius greater than the ionic radius than the first alkali metal ion. The second metal ion is present in the glass substrate as an oxide thereof (e.g., $Na_2O$, $K_2O$, $Rb_2O$, $Cs_2O$ or a combination thereof).

In one or more embodiments, the metal oxide concentration gradient extends through a substantial portion of the thickness t or the entire thickness t of the strengthened glass substrate, including the CT region. In one or more embodiments, the concentration of the metal oxide is about 0.5 mol % or greater in the CT region. In some embodiments, the concentration of the metal oxide may be about 0.5 mol % or greater (e.g., about 1 mol % or greater) along the entire thickness of the strengthened glass substrate, and is greatest at the first major surface and/or the second major surface and decreases substantially constantly to a point between the first major surface and the second major surface. At that point, the concentration of the metal oxide is the least along the entire thickness t; however the concentration is also non-zero at that point. In other words, the non-zero concentration of that particular metal oxide extends along a substantial portion of the thickness t (as described herein) or the entire thickness t. In some embodiments, the lowest concentration in the particular metal oxide is in the CT region. The total concentration of the particular metal oxide in the strengthened glass substrate may be in the range from about 1 mol % to about 20 mol %.

In one or more embodiments, the strengthened glass substrate includes a first metal oxide concentration and a second metal oxide concentration, such that the first metal oxide concentration is in the range from about 0 mol % to about 15 mol % along a first thickness range from about 0t to about 0.5t, and the second metal oxide concentration is in the range from about 0 mol % to about 10 mol % from a second thickness range from about 0 micrometers to about 25 micrometers (or from about 0 micrometers to about 12 micrometers). The strengthened glass substrate may include an optional third metal oxide concentration. The first metal oxide may include $Na_2O$ while the second metal oxide may include $K_2O$.

The concentration of the metal oxide may be determined from a baseline amount of the metal oxide in the glass substrate prior to being modified to include the concentration gradient of such metal oxide.

Glass Compositions

Suitable glass compositions for use in the glass substrate include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from 9 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and $Cs_2O$) that is greater than or equal to about 8 mol %, greater than or equal to about 10 mol %, or greater than or equal to about 12 mol %. In some embodiments, the glass composition includes a total amount of $R_2O$ in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of $Rb_2O$, $Cs_2O$ or both $Rb_2O$ and $Cs_2O$. In one or more embodiments, the $R_2O$ may include the total amount of $Li_2O$, $Na_2O$ and $K_2O$ only. In one or more embodiments, the glass composition may comprise at least one alkali metal oxide selected from $Li_2O$, $Na_2O$ and $K_2O$, wherein the alkali metal oxide is present in an amount greater than about 8 mol % or greater.

In one or more embodiments, the glass composition comprises $Na_2O$ in an amount greater than or equal to about 8 mol %, greater than or equal to about 10 mol %, or greater than or equal to about 12 mol %. In one or more embodiments, the composition includes $Na_2O$ in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from about 11 mol % to about 16 mol %, and all ranges and sub-ranges therebetween.

In one or more embodiments, the glass composition includes less than about 4 mol % $K_2O$, less than about 3 mol % $K_2O$, or less than about 1 mol % $K_2O$. In some instances, the glass composition may include $K_2O$ in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of $K_2O$.

In one or more embodiments, the glass composition comprises $Li_2O$ in an amount greater than or equal to about 0.5 mol %, greater than or equal to about 1 mol %, or greater than or equal to about 1.5 mol %. In one or more embodiments, the composition includes $Na_2O$ in a range from about from about 0.5 mol % to about 12 mol %, from about 1 mol % to about 12 mol %, from about 1.5 mol % to about 12 mol %, from about 2 mol % to about 12 mol %, from about 2.5 mol % to about 12 mol %, from about 3 mol % to about 12 mol %, from about 4 mol % to about 12 mol %, from about 5 mol % to about 12 mol %, from about 6 mol % to about 12 mol %, from about 0.5 mol % to about 11 mol %, from about 0.5 mol % to about 10 mol %, from about 0.5 mol % to about 9 mol %, from about 0.5 mol % to about 8 mol %, from about 0.5 mol % to about 7 mol %, from about 0.5 mol % to about 6 mol %, from about 3 mol % to about 8 mol %, from about 4 mol % to about 8 mol %, or from about 5 mol % to about 8 mol %, and all ranges and sub-ranges therebetween.

In one or more embodiments, the glass composition is substantially free of $Li_2O$.

In one or more embodiments, the amount of $Na_2O$ in the composition may be greater than the amount of $Li_2O$. In some instances, the amount of $Na_2O$ may be greater than the combined amount of $Li_2O$ and $K_2O$. In one or more alternative embodiments, the amount of $Li_2O$ in the composition may be greater than the amount of $Na_2O$ or the combined amount of $Na_2O$ and $K_2O$.

In one or more embodiments, the glass composition may include a total amount of RO (which is the total amount of alkaline earth metal oxide such as CaO, MgO, BaO, ZnO and SrO) in a range from about 0 mol % to about 2 mol %. In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises $ZrO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $ZrO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises $SnO_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $SnO_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as $Fe_2O_3$, wherein Fe is present in an amount up to (and including) about 1 mol %. In some embodiments, the glass composition is substantially free of Fe. In one or more embodiments, the glass composition comprises $Fe_2O_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises $Fe_2O_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein.

Displays

In one or more embodiments, the glass substrate 124 has a curvature (first radius of curvature) that matches the curvature (second radius of curvature) of at least a portion of a display module 126, as shown in FIG. 1. In one or more embodiments, at least a portion of the display module 126 is curved to approach or match the curvature of the glass substrate 124. In one or more embodiments, the display module 126 includes a second glass substrate 130, a backlight unit 128 and other components, any of which may be flexible or may permanently exhibit a curvature. Backlight unit 128 may include, for example, a liquid crystal display (LCD) or a deadfront display. In some embodiments, the entire display module is curved to a second radius of curvature. In one or more embodiments, the glass substrate 124 is cold-bent to a curvature that approaches or matches the curvature of at least a portion of the display module 126. In one or more embodiments, at least a portion of the display module 126 is cold-bent to a curvature that approaches or matches the curvature of the cold-bent glass substrate 124.

In one or more embodiments, when the first radius of curvature of the glass substrate 124 varies across its area, the first radius of curvature referred to herein is the minimum radius of curvature of the glass substrate. Similarly, in one or more embodiments, when the second radius of curvature of the display module 126 varies across its area, the second radius of curvature referred to herein is the minimum radius of curvature of the display module. In one or more embodiments, the first radius of curvature may be the minimum radius of curvature adjacent to the display module (as described herein) or the touch panel. In one or more embodiments, the location of the first radius of curvature is the same or near the location of the second radius of curvature. In other words, the first radius of curvature of the curved glass substrate is measured at the same or near the same location at which the second radius of curvature is measured on the second glass substrate or the curved surface of the base in terms of width and length. In one or more embodiments, the term "near" when used with reference to the first and second radius of curvature means the first radius of curvature and the second radius of curvature are measured at locations within a distance of 10 cm, 5 cm, or 2 cm from one another.

In one or more embodiments, the glass substrate 124 has a first radius of curvature of about 20 mm or greater, 40 mm or greater, 50 mm or greater, 60 mm or greater, 100 mm or greater, 250 mm or greater or 500 mm or greater. For example, the first radius of curvature may be in a range from about 20 mm to about 1500 mm, from about 30 mm to about 1500 mm, from about 40 mm to about 1500 mm, from about 50 mm to about 1500 mm, 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass substrates 124 having a thickness of less than about 0.4 mm may exhibit a radius of curvature that is less than about 100 mm, or less than about 60 mm.

In one or more embodiments, the display module 126 has a second radius of curvature of about 20 mm or greater, 40 mm or greater, 50 mm or greater, 60 mm or greater, 100 mm or greater, 250 mm or greater or 500 mm or greater. For example, the second radius of curvature may be in a range from about 20 mm to about 1500 mm, from about 30 mm to about 1500 mm, from about 40 mm to about 1500 mm, from about 50 mm to about 1500 mm, 60 mm to about 1500 mm, from about 70 mm to about 1500 mm, from about 80 mm to about 1500 mm, from about 90 mm to about 1500 mm, from about 100 mm to about 1500 mm, from about 120 mm to about 1500 mm, from about 140 mm to about 1500 mm, from about 150 mm to about 1500 mm, from about 160 mm to about 1500 mm, from about 180 mm to about 1500 mm, from about 200 mm to about 1500 mm, from about 220 mm to about 1500 mm, from about 240 mm to about 1500 mm, from about 250 mm to about 1500 mm, from about 260 mm to about 1500 mm, from about 270 mm to about 1500 mm, from about 280 mm to about 1500 mm, from about 290 mm to about 1500 mm, from about 300 mm to about 1500 mm, from about 350 mm to about 1500 mm, from about 400 mm to about 1500 mm, from about 450 mm to about 1500 mm, from about 500 mm to about 1500 mm, from about 550 mm to about 1500 mm, from about 600 mm to about 1500 mm, from about 650 mm to about 1500 mm, from about 700 mm to about 1500 mm, from about 750 mm to about 1500 mm, from about 800 mm to about 1500 mm, from about 900 mm to about 1500 mm, from about 950 mm to about 1500 mm, from about 1000 mm to about 1500 mm, from about 1250 mm to about 1500 mm, from about 20 mm to about 1400 mm, from about 20 mm to about 1300 mm, from about 20 mm to about 1200 mm, from about 20 mm to about 1100 mm, from about 20 mm to about 1000 mm, from about 20 mm to about 950 mm, from about 20 mm to about 900 mm, from about 20 mm to about 850 mm, from about 20 mm to about 800 mm, from about 20 mm to about 750 mm, from about 20 mm to about 700 mm, from about 20 mm to about 650 mm, from about 20 mm to about 200 mm, from about 20 mm to about 550 mm, from about 20 mm to about 500 mm, from about 20 mm to about 450 mm, from about 20 mm to about 400 mm, from about 20 mm to about 350 mm, from about 20 mm to about 300 mm, from about 20 mm to about 250 mm, from about 20 mm to about 200 mm, from about 20 mm to about 150 mm, from about 20 mm to about 100 mm, from about 20 mm to about 50 mm, from about 60 mm to about 1400 mm, from about 60 mm to about 1300 mm, from about 60 mm to about 1200 mm, from about 60 mm to about 1100 mm, from about 60 mm to about 1000 mm, from about 60 mm to about 950 mm, from about 60 mm to about 900 mm, from about 60 mm to about 850 mm, from about 60 mm to about 800 mm, from about 60 mm to about 750 mm, from about 60 mm to about 700 mm, from about 60 mm to about 650 mm, from about 60 mm to about 600 mm, from about 60 mm to about 550 mm, from about 60 mm to about 500 mm, from about 60 mm to about 450 mm, from about 60 mm to about 400 mm, from about 60 mm to about 350 mm, from about 60 mm to about 300 mm, or from about 60 mm to about 250 mm. In one or more embodiments, glass substrates having a thickness of less than about 0.4 mm may exhibit a radius of curvature that is less than about 100 mm, or less than about 60 mm.

In one or more embodiments, the glass substrate is cold-bent to exhibit a first radius curvature that is within 10% (e.g., about 10% or less, about 9% or less, about 8% or less, about 7% or less, about 6% or less, or about 5% or less) of the second radius of curvature of the display module 126. For example, if the display module 126 exhibits a radius of curvature of 1000 mm, the glass substrate is cold-bent to have a radius of curvature in a range from about 900 mm to about 1100 mm.

Figure 4:
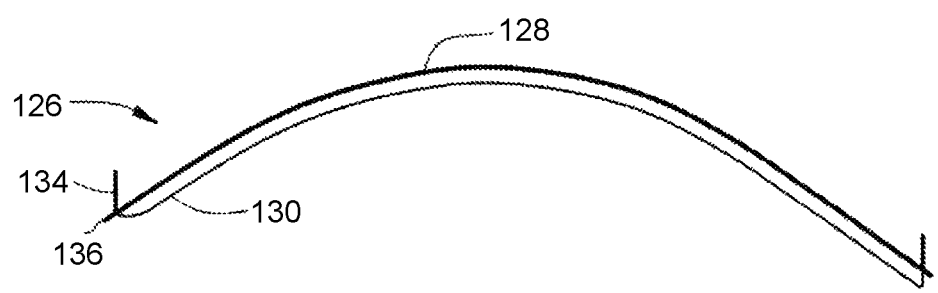
FIG. 4 is a detailed view of a display module according to some embodiments.
Figure 5:
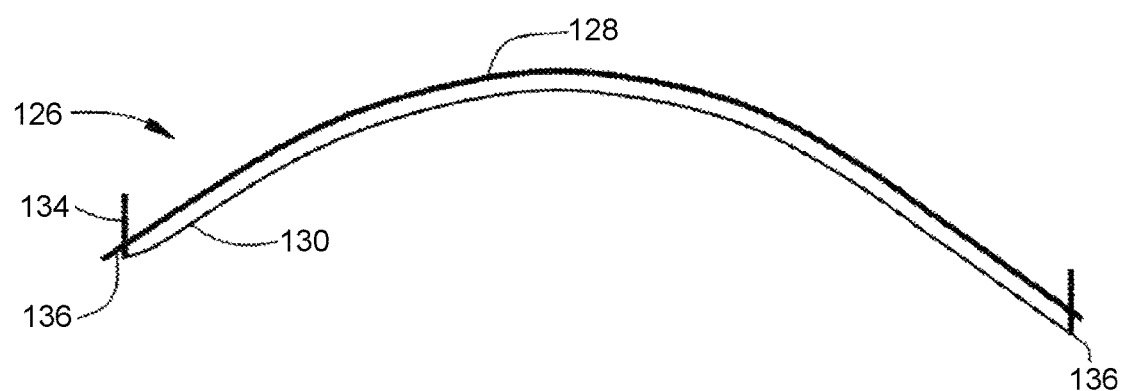
FIG. 5 is a detailed view of a display module according to some embodiments.
Figure 6:
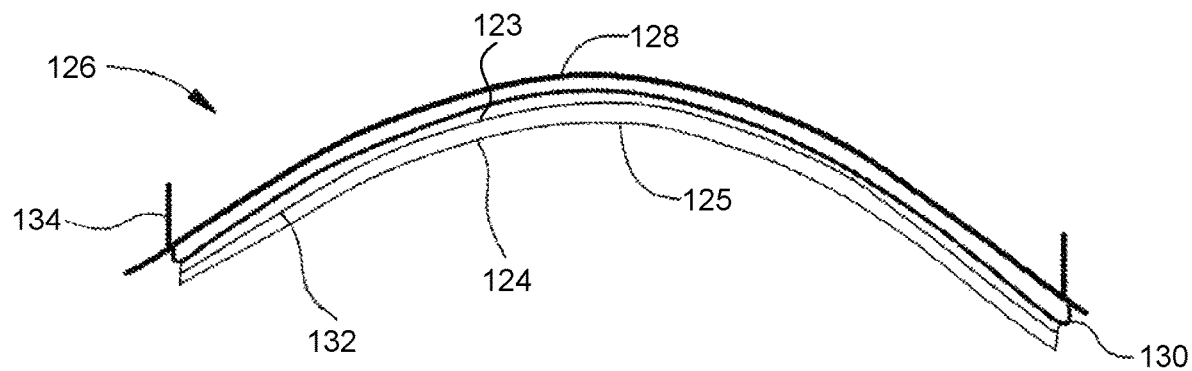
FIG. 6 is a detailed view of a display according to some embodiments.

In one or more embodiments, the display module 126 includes a second glass substrate 130 and a backlight unit 128, as shown in FIG. 4. As shown in FIGS. 5 and 6, the second glass substrate 130 is disposed adjacent the first major surface 123 of the glass substrate 124. Accordingly, the second glass substrate 130 is disposed between the backlight unit 128 and the first major surface 123. In the embodiment shown, the backlight unit 128 is optionally curved to exhibit the second radius of curvature of the display module 126. In one or more embodiments, the backlight unit 128 may be flexible to curve to the second radius of curvature. In one or more embodiments, the second glass substrate 130 may be curved to the second radius of curvature. In one or more specific embodiments, the second glass substrate 130 may be cold-bent to exhibit the second radius of curvature. In such embodiments, the second radius of curvature is measured on the surface of the second glass substrate 130 adjacent the glass substrate 124. In one or more embodiments, the second glass substrate 130 may be cold-bent before or during lamination. The backlight unit 128 may be attached to the curved glass substrate, the second glass substrate and/or a frame (as described herein) via an adhesive (as described herein) or by mechanical means (e.g., screws, clamps, clips and the like) known in the art.

In one or more embodiments, the second glass substrate 130 may have a thickness greater than the thickness of the glass substrate 124. In one or more embodiments, the thickness is greater than 1 mm, or about 1.5 mm or greater. In one or more embodiments, the thickness of the second glass substrate 130 may have a thickness that is substantially the same as the glass substrate 124. In one or more embodiments, the second glass substrate 130 has a thickness in a range from about 0.1 mm to about 1.5 mm, from about 0.15 mm to about 1.5 mm, from about 0.2 mm to about 1.5 mm, from about 0.25 mm to about 1.5 mm, from about 0.3 mm to about 1.5 mm, from about 0.35 mm to about 1.5 mm, from about 0.4 mm to about 1.5 mm, from about 0.45 mm to about 1.5 mm, from about 0.5 mm to about 1.5 mm, from about 0.55 mm to about 1.5 mm, from about 0.6 mm to about 1.5 mm, from about 0.65 mm to about 1.5 mm, from about 0.7 mm to about 1.5 mm, from about 0.1 mm to about 1.4 mm, from about 0.1 mm to about 1.3 mm, from about 0.1 mm to about 1.2 mm, from about 0.1 mm to about 1.1 mm, from about 0.1 mm to about 1.05 mm, from about 0.1 mm to about 1 mm, from about 0.1 mm to about 0.95 mm, from about 0.1 mm to about 0.9 mm, from about 0.1 mm to about 0.85 mm, from about 0.1 mm to about 0.8 mm, from about 0.1 mm to about 0.75 mm, from about 0.1 mm to about 0.7 mm, from about 0.1 mm to about 0.65 mm, from about 0.1 mm to about 0.6 mm, from about 0.1 mm to about 0.55 mm, from about 0.1 mm to about 0.5 mm, from about 0.1 mm to about 0.4 mm, or from about 0.3 mm to about 0.7 mm.

The second glass substrate 130 may have the same glass composition as the glass substrate 124 or may differ from the glass composition used for the glass substrate 124. In one or more embodiments, the second glass substrate 130 may have an alkali-free glass composition. Suitable glass compositions for use in the second glass substrate 130 may include soda lime glass, alkali-free aluminosilicate glass, alkali-free borosilicate glass, alkali-free boroaluminosilicate glass, alkali-containing aluminosilicate glass, alkali-containing borosilicate glass, and alkali-containing boroaluminosilicate glass. In one or more embodiments, the second glass substrate 130 may be strengthened (as disclosed herein with respect to the glass substrate 124). In some embodiments, the second glass substrate 130 is unstrengthened or strengthened only by mechanical and/or thermal strengthening (i.e., not strengthened by chemical strengthening). In some embodiments, the second glass substrate 130 may be annealed.

In one or more embodiments, the display module 126 may include an organic light-emitting diode (OLED) display. In such embodiments, the first radius of curvature of the glass substrate 124 may be within 10% of the second radius of curvature of the OLED display or the curved surface on which it is assembled (such as a base).

In one or more embodiments, the display module 126 includes a frame 134. In the embodiment shown, the frame 134 is positioned between the backlight unit 128 and the second glass substrate 130. The frame may include flanges 136 extending outward from the display module 126 forming an "L" shape with respect to the frame. In one or more embodiments, the frame 134 at least partially surrounds the backlight unit 128. In one or more embodiments as shown in FIG. 5, the frame at least partially surrounds the second glass substrate 130. In one or more embodiments in which the display module comprises an OLED display, the OLED structure is between the frame and the glass substrate.

In one or more embodiments, the frame 134 is associated or assembled with the glass substrate 124, the second glass substrate 130 or another component of the display module in the case of OLED displays. In one or more embodiments, the frame can either at least partially surround the minor surface of the glass substrate 124 or the minor surface of the glass substrate may not be surrounded by the frame. In other words, the frame may include secondary flanges 136 that extend to partially surround the second glass substrate 124, the minor surface of the glass substrate 124, and/or another component of the display module in the case of OLED displays.

Figure 3:
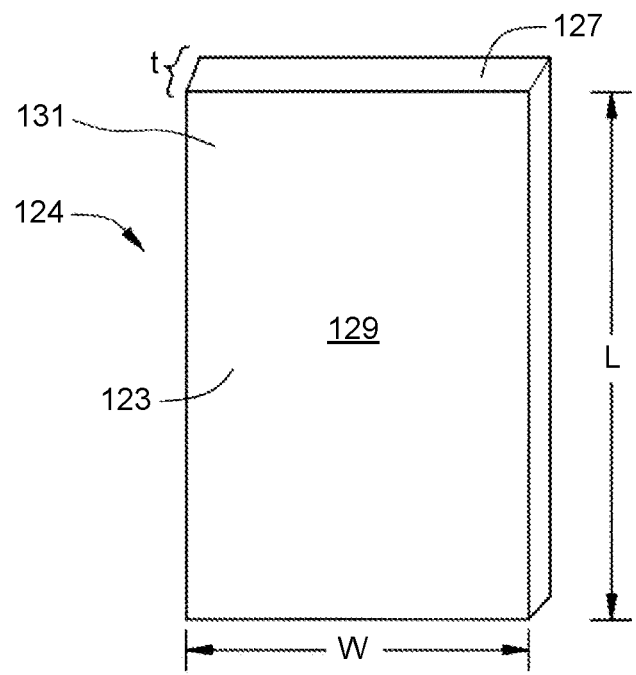
FIG. 3 is a front perspective view of a glass substrate of a flexible display according to some embodiments.

In one or more embodiments, the flexible display 120 includes an adhesive or adhesive layer 132 between the glass substrate 124 and the display module 126. The adhesive may be optically clear. In some embodiments, the adhesive 132 is disposed on a portion of the glass substrate 124 and/or the display module 126. For example, as shown in FIG. 3, the glass substrate 124 may include a periphery 131 adjacent the minor surface defining an interior portion 129 and the adhesive may be disposed on at least a portion of the periphery 131. The thickness of the adhesive may be tailored to ensure lamination between the display module 126 (and more particularly the second glass substrate) and the glass substrate 124. For example, the adhesive 132 may have a thickness of about 1 mm or less. In some embodiments, the adhesive 132 has a thickness in a range from about 200 μm to about 500 μm, from about 225 μm to about 500 μm, from about 250 μm to about 500 μm, from about 275 μm to about 500 μm, from about 300 μm to about 500 μm, from about 325 μm to about 500 μm, from about 350 μm to about 500 μm, from about 375 μm to about 500 μm, from about 400 μm to about 500 μm, from about 200 μm to about 475 μm, from about 200 μm to about 450 μm, from about 200 μm to about 425 μm, from about 200 μm to about 400 μm, from about 200 μm to about 375 μm, from about 200 μm to about 350 μm, from about 200 μm to about 325 μm, from about 200 μm to about 300 μm, or from about 225 μm to about 275 μm.

Surface Treatments

In one or more embodiments, either one of or both the first major surface 123 and the second major surface 125 of the glass substrate 124 includes a surface treatment. The surface treatment may cover at least a portion of the first major surface 123 and the second major surface 125. Exemplary surface treatments include an easy-to-clean surface, an anti-glare surface, an anti-reflective surface, a haptic surface, and a decorative surface. In one or more embodiments, the at least a portion of the first major surface 123 and/or the second major surface 125 may include any one, any two or all three of an anti-glare surface, an anti-reflective surface, a haptic surface, and a decorative surface. For example, first major surface 123 may include an anti-glare surface and the second major surface 125 may include an anti-reflective surface. In another example, the first major surface 123 includes an anti-reflective surface and the second major surface 125 includes an anti-glare surface. In yet another example, the first major surface 123 comprises either one of or both the anti-glare surface and the anti-reflective surface, and the second major surface 125 includes the decorative surface.

The anti-reflective surface may be formed using an etching process and may exhibit a transmission haze 20% or less (e.g., about 15% or less, or about 10% or less), and a distinctiveness of image (DOI) of about 80 or less. As used herein, the terms "transmission haze" and "haze" refer to the percentage of transmitted light scattered outside an angular cone of about ±2.5° in accordance with ASTM procedure D1003. For an optically smooth surface, transmission haze is generally near zero. As used herein, the term "distinctness of image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety. In accordance with method A of ASTM 5767, substrate reflectance factor measurements are made on the anti-glare surface at the specular viewing angle and at an angle slightly off the specular viewing angle. The values obtained from these measurements are combined to provide a DOI value. In particular, DOI is calculated according to the equation $$DOI = \left[1 - \frac{Ros}{Rs}\right] \times 100, \quad (1)$$

where Ros is the relative reflection intensity average between 0.2° and 0.4 away from the specular reflection direction, and Rs is the relative reflection intensity average in the specular direction (between +0.05° and −0.05°, centered around the specular reflection direction). If the input light source angle is +20° from the sample surface normal (as it is throughout this disclosure), and the surface normal to the sample is taken as 0°, then the measurement of specular reflected light Rs is taken as an average in the range of about −19.95° to −20.05°, and Ros is taken as the average reflected intensity in the range of about −20.2° to −20.4° (or from −19.6° to −19.8°, or an average of both of these two ranges). As used herein, DOI values should be directly interpreted as specifying a target ratio of Ros/Rs as defined herein. In some embodiments, the anti-glare surface has a reflected scattering profile such that >95% of the reflected optical power is contained within a cone of +/−10°, where the cone is centered around the specular reflection direction for any input angle.

The resulting the anti-glare surface may include a textured surface with plurality of concave features having an opening facing outwardly from the surface. The opening may have an average cross-sectional dimension of about 30 micrometers or less. In one or more embodiments, the anti-glare surface exhibits low sparkle (in terms of low pixel power deviation reference or PPDr) such as PPDr of about 6% or less. As used herein, the terms "pixel power deviation referenced" and "PPDr" refer to the quantitative measurement for display sparkle. Unless otherwise specified, PPDr is measured using a display arrangement that includes an edge-lit liquid crystal display screen (twisted nematic liquid crystal display) having a native sub-pixel pitch of 60 μm×180 μm and a sub-pixel opening window size of about 44 μm× about 142 μm. The front surface of the liquid crystal display screen had a glossy, anti-reflection type linear polarizer film. To determine PPDr of a display system or an anti-glare surface that forms a portion of a display system, a screen is placed in the focal region of an "eye-simulator" camera, which approximates the parameters of the eye of a human observer. As such, the camera system includes an aperture (or "pupil aperture") that is inserted into the optical path to adjust the collection angle of light, and thus approximate the aperture of the pupil of the human eye. In the PPDr measurements described herein, the iris diaphragm subtends an angle of 18 milliradians.

The anti-reflective surface may be formed by a multi-layer coating stack formed from alternating layers of a high refractive index material and a low refractive index material. Such coatings stacks may include 6 layers or more. In one or more embodiment, the anti-reflective surface may exhibit a single-side average light reflectance of about 2% or less (e.g., about 1.5% or less, about 1% or less, about 0.75% or less, about 0.5% or less, or about 0.25% or less) over the optical wavelength regime in the range from about 400 nm to about 800 nm. The average reflectance is measured at an incident illumination angle greater than about 0 degrees to less than about 10 degrees.

The decorative surface may include any aesthetic design formed from a pigment (e.g., ink, paint and the like) and can include a wood-grain design, a brushed metal design, a graphic design, a portrait, or a logo. In one or more embodiments, the decorative surface exhibits a deadfront effect in which the decorative surface disguises or masks the underlying display from a viewer when the display is turned off but permits the display to be viewed when the display is turned on. The decorative surface may be printed onto the glass substrate. In one or more embodiments, the anti-glare surface includes an etched surface. In one or more embodiments, the anti-reflective surface includes a multi-layer coating. In one or more embodiments, the easy-to-clean surface includes an oleophobic coating that imparts anti-fingerprint properties. In one or more embodiments, the haptic surface includes a raised or recessed surface formed from depositing a polymer or glass material on the surface to provide a user with tactile feedback when touched.

In one or more embodiments, the surface treatment (i.e., the easy-to-clean surface, the anti-glare surface, the anti-reflective surface, the haptic surface and/or the decorative surface) is disposed on at least a portion of the periphery and the interior portion is substantially free of the surface treatment.

In one or more embodiments, the display module includes touch functionality and such functionality is accessible through the glass substrate. In one or more embodiments, displayed images or content shown by the display module is visible through the glass substrate.

Methods for Cold-Bending Glass

A further aspect of this disclosure pertains to various methods and systems for cold-bending a glass substrate, such as substrate 124, and/or forming a display. In various embodiments, the methods and systems discussed herein utilize air pressure differentials to cause bending of the glass substrate. As noted above, these systems and methods bend the glass substrate without use of the high temperatures (e.g., temperatures greater than the glass softening point) that are typical with hot-bending/hot-forming processes.

Figure 7:
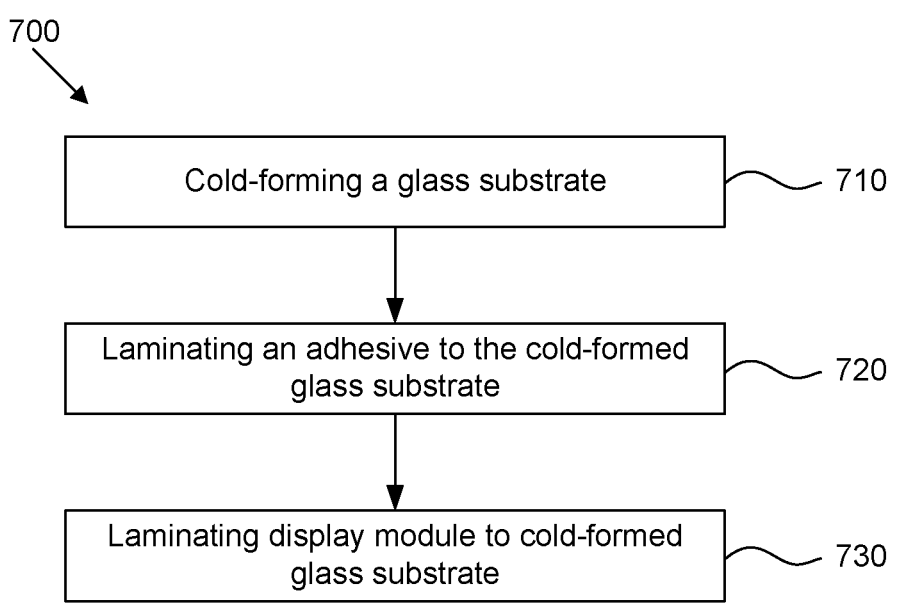
FIG. 7 is a process flow diagram of a method for forming the display according to some embodiments.
Figure 8:
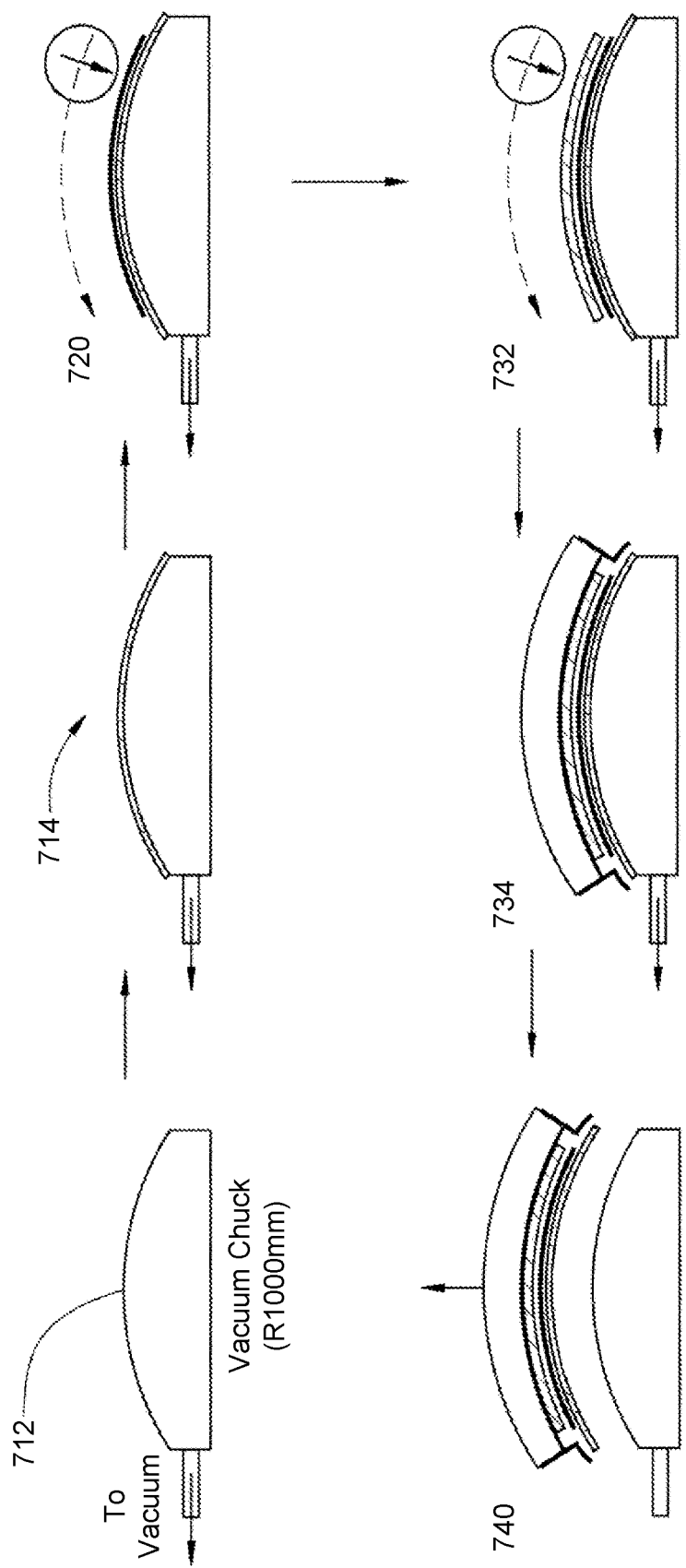
FIG. 8 is an illustration of the method described in FIG. 7.

Referring to FIGS. 7 and 8, a method 700 of forming a display is shown according to exemplary embodiments. In one or more embodiments, the method includes a step 710 of cold-bending a glass substrate, such as substrate 124, to a first radius of curvature (as described herein), and laminating a display module 126 to the first one of the major surfaces (see FIGS. 1 and 2) while maintaining the first radius of curvature in the glass substrate to form the display. In one or more embodiments, the display module has a second radius of curvature (as described herein) that is within 10% of the first radius of curvature. As shown in FIG. 8, in one or more embodiments, cold-bending the glass substrate includes applying a vacuum to the first second major surface of the glass substrate to generate the first radius of curvature 714. Accordingly, in the embodiment shown in FIG. 8, applying the vacuum includes placing the glass substrate on a vacuum fixture 712 before applying the vacuum to the second major surface. In one or more embodiments, to maintain the first radius of curvature, the glass substrate and subsequent assembly with the display module (steps 720, 730) is performed while the vacuum is applied to the glass substrate to cold-bend the glass substrate to the first radius of curvature. In other words, the glass substrate 124 is temporarily cold-bent by applying the vacuum, and subsequent lamination with the display module 126 permanently cold-bends the glass substrate and forms the display. In such embodiments, the display module provides the rigidity needed to permanently cold-bend the glass substrate. Other mechanisms to temporarily cold-bend the glass substrate may be used. For example, the glass substrate may be temporarily affixed to a mold having the desired curvature to cold-bend the glass substrate. The glass substrate may be temporarily affixed by a pressure sensitive adhesive or other mechanism.

After cold-bending the glass substrate, the method of one or more embodiments includes laminating an adhesive to the first major surface of the glass substrate 124 before laminating the display module to the first major surface such that the adhesive is disposed between the first major surface and the display module. In one or more embodiments, laminating the adhesive may include applying a layer of the adhesive and then applying a normal force using roller or other mechanism. Exemplary examples include any suitable optically clear adhesive for bonding the glass substrate to the second glass substrate of the display module 126. In one example, the adhesive may include an optically clear adhesive available from 3M Corporation under the trade name 8215. The thickness of the adhesive may be in a range as otherwise described herein (e.g., from about 200 µm to about 500 µm).

In one or more embodiments, step 730 of laminating a display module includes laminating the second glass substrate to the glass substrate (step 732 in FIG. 8) and then attaching the backlight unit to the second glass substrate (step 734, in FIG. 8). In one or more embodiments, the method includes cold-bending the second glass substrate during lamination to the glass substrate. In one or more embodiments, the second glass substrate is curved prior to lamination. For example, the second glass substrate may be temporarily curved or cold-bent before lamination to exhibit the second radius of curvature. In one or more embodiments, the backlight unit is curved to exhibit the second radius of curvature. In one or more embodiments, the backlight unit is flexible and is curved during lamination to the second radius of curvature. In one or more embodiments, the backlight unit may be curved prior to lamination. For example, the backlight unit may be temporarily curved before lamination to exhibit the second radius of curvature. In another example, the backlight unit may be permanently curved to exhibit the second radius of curvature).

In one or more embodiments, step 734 includes attaching a frame to one of the backlight unit and the second glass substrate. In one or more embodiments, the method includes step 740 of removing the vacuum from the second major surface of the glass substrate 124. For example, removing the vacuum from the second major surface may include removing the display from the vacuum fixture.

As noted above, in addition to providing processing advantages such as eliminating expensive and/or slow heating steps, the cold-bending processes discussed herein are believed to generate curved glass substrates with a variety of properties that are superior to hot-formed glass substrates, particularly for display cover glass applications. For example, for at least some glass materials, heating during hot-forming processes decreases optical properties of curved glass substrates, and may increase optical distortion. Thus, the curved glass substrates formed utilizing the cold-bending processes/systems discussed herein provide for both curved glass shape along with improved optical qualities not believed achievable with hot-bending processes.

Further, many glass coating materials (e.g., anti-reflective coatings) are applied via deposition processes, such as sputtering processes that are typically ill-suited for coating curved glass articles. In addition, many coating materials also are not able to survive the high temperatures associated with hot-bending processes. Thus, in particular embodiments discussed herein, one or more coating materials are applied to a major surface and/or to a second major surface of the glass substrate prior to cold-bending (when the glass substrate is flat), and the coated glass substrate is bent to a curved shape as discussed herein. Thus, the processes and systems discussed herein allow for bending of glass after one or more coating materials have been applied to the glass, in contrast to typical hot-forming processes.

Dynamically-Adjustable Display Systems

Embodiments herein relate to dynamically adjustable display systems. Some embodiments relate to dynamically adjustable display systems that automatically adjust a flexible display based upon ambient lighting conditions in order to improve or optimize visibility of the flexible display.

The display system 100 can be mounted on a support surface or a support structure, such as a wall, table, or countertop, for use as an automated teller machine display, a check-in/check-out display, or a display for placing an order at a store or restaurant, among others. The display system 100 can also be incorporated into a free-standing device, such as a podium or the like. The display system 100 can also be incorporated into any of various vehicles, such as a plane, a boat, or an automobile, among others.

Figure 9:
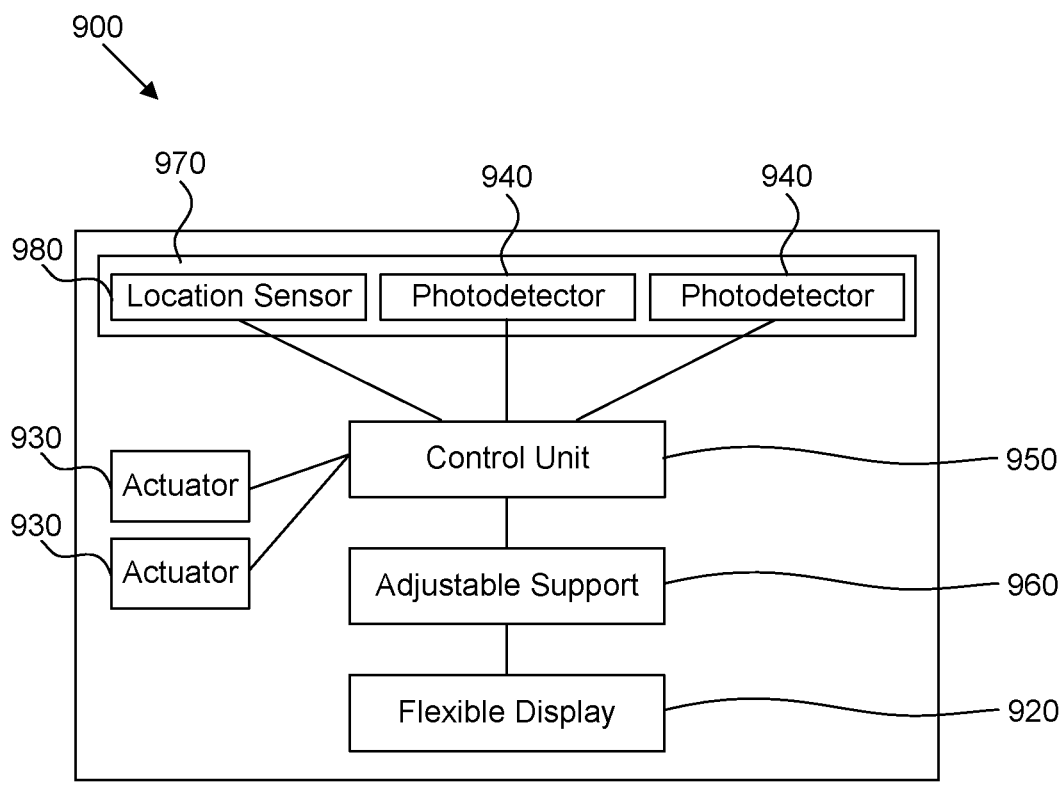
FIG. 9 is a schematic block diagram of the components of a display system according to some embodiments.

Referring now to FIG. 9, there is shown a diagram of the components of a display system 900 according to some embodiments. The display system 900 may include a flexible display 920 capable of bending along one or more bending axes, a plurality of photodetectors 940 for detecting ambient light, a control unit 950 in communication with the photodetectors 940 and an adjustable support 960 that is configured to adjust the flexible display 920. The control unit 950 can cause the adjustable support 960 to adjust the flexible display 920, such as by bending the flexible display 920, based on ambient light detected at each of the photodetectors 940 in order to reduce the amount or intensity of ambient light detected by at least one of the photodetectors 940 so as to improve or optimize the visibility of media on the flexible display 920. Flexible display 920 may include a substrate (e.g., substrate 124) and a display module (e.g., display module 126) as discussed herein. Further, display 920 may include components associated with glass substrate 124 and/or display module 126 as discussed herein, for example, a backlight unit, a second glass substrate, etc.

Figure 10:
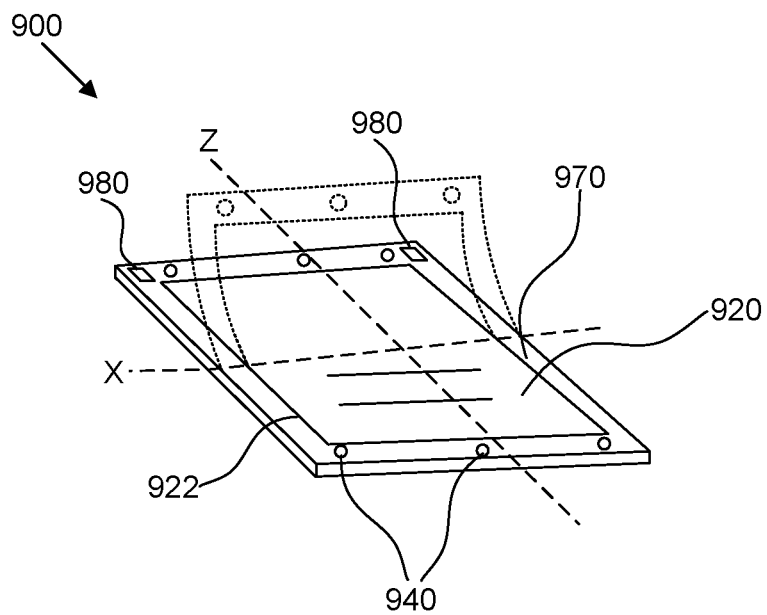
FIG. 10 is a perspective view of a flexible display according to some embodiments.

A flexible display 920 of a dynamically adjustable display system 900 according to some embodiments is shown by FIG. 10. The flexible display 920 is capable of bending in a reversible manner. The term "bending" as used herein, refers to a change in the shape/configuration of the flexible display itself by bending the display about an axis extending on or parallel to a surface of the display (e.g., the first major surface and/or the second major surface 123/125 of substrate 124) without otherwise altering of the position of the display. In some embodiments, the flexible display 920 may originally have a planar configuration and can bend into a concave configuration, a convex configuration, or a combination thereof. In some embodiments, the flexible display 920 may originally have a concave configuration, a convex configuration, or a combination thereof and can bend into a flat or planar configuration. The flexible display 920 may have an original curvature or be bent to any curvature as discussed herein.

As the flexible display 920 can bend reversibly, the flexible display 120, once bent, can return to its original configuration. Alternatively, the flexible display 120, once bent, can bend into a different configuration. For example, the flexible display 920 may originally have a flat or planar configuration, and can be bent so as to have a concave configuration, and then can be further bent to have a convex configuration, and subsequently returned to the planar configuration.

In some embodiments, the flexible display 920 includes a cold-bent glass substrate, as discussed in detail herein. The cold-bent glass substrate has a number of advantages over conventional glass articles formed by conventional thermal-shaping processes, including among other benefits, the ability to reversibly bend without fatigue, reduced cost of construction, and improved optical and surface properties.

In the embodiment of FIG. 10, the flexible display 920 is shown in a first position in which the flexible display 920 is substantially planar. The flexible display 920 is further shown as bending to a hypothetical second position about a transverse axis, X, extending on or parallel to a surface of the flexible display 920 in which the flexible display 920 has a generally concave configuration. The entire flexible display 920 may bend about a bending axis, or only a portion thereof may bend about the bending axis, such that a first portion of the flexible display is bent, while a second portion remains unbent (e.g. substantially flat or planar). Further, the flexible display 920 can bend along a bending axis to a desired degree, and may be bent about the bending axis to a greater or lesser extent as desired. The flexible display 920 can bend about alternate bending axes, such as a longitudinal axis, Z. However, the bending axis need not be a transverse or longitudinal axis, and can be a diagonal axis extending on or parallel to a surface of the flexible display 920.

In some embodiments, the flexible display 920 is capable of bending about one or more bending axes. In some embodiments, the flexible display 920 can be bent along multiple bending axes simultaneously. For example, a first portion of a flexible display 920 can be bent in a first bending direction, and a second portion of the flexible display 920 can be bent in a second bending direction.

The display system 900 further includes an adjustable support 960 that is configured to selectively adjust the flexible display 920. The flexible display 920 is mounted on the adjustable support 960 so that the adjustable support 960 can adjust the configuration and position of the flexible display 920. In some embodiments, the adjustable support 960 can adjust the flexible display 920 by bending the flexible display 920. As shown for example in FIG. 11, the adjustable support 960 may be connected to a rear surface 964 of the flexible display 920 and a front, user-facing surface of the flexible display 920 is used to display media to be viewed by a user. The adjustable support 960 may include one or more mechanical actuators 966 for selectively bending the flexible display 920. In embodiments having two or more mechanical actuators 966, the mechanical actuators 966 may be connected to various portions of the flexible display 920 such that each mechanical actuator 966 can exert a force on a different portion of the flexible display 920. In this way, one or more actuators 966 can be actuated so as to bend the flexible display 920 in a particular manner, such by bending the flexible display 920 along one or more bending axes. Further, the actuators 966 are capable of bending the flexible display 920 to various extents, such that the degree of bending of the flexible display 920 can be adjusted incrementally.

In some embodiments, the mechanical actuator 966 may be one or more legs having a portion thereof affixed to the flexible display 920 and having a second portion that is movable about a hinge, wherein the leg may be mechanically rotated about the hinge so as to bend the display via a drive mechanism, such as a motor, among others. In embodiments having more than one leg, the flexible display 920 may bend along multiple bending axes. In some embodiments, the mechanical actuator 966 may include a chain which is fixed to a portion (e.g., top portion) of rear surface 964 of flexible display 920 in a sealed track formed in rear surface 964. In such embodiments, by pushing/pulling on the chain the flexible display 920 will curl in a direction of push force or pull force exerted by the chain. In embodiments having more than one chain, the flexible display 920 may bend along multiple bending axes. In some embodiments, the flexible display 920 may bend by means of one or more piezoelectric actuators.

In some embodiments, the adjustable support 960 is further configured to tilt the flexible display 920. The term "tilt" refers to a change in the position of the flexible display 920, such as by rotating or pivoting the flexible display 920 about a fixed point without bending the flexible display 920. The adjustable support 960 may be tilted by means of the one or more mechanical actuators 966. The ability of the adjustable support 960 to bend the flexible display 920 as well as pivot the flexible display 920 provides additional possible configurations and positions of the flexible display 920 for improving or optimizing visibility of the flexible display 920.

In some embodiments, the adjustable support 960 may also be capable of manual adjustment by a user so that the user can selectively position and bend the flexible display 920 in a desired manner. The display system 900 may include one or more actuators 930, such as buttons, controls, or levers, for allowing the user to manually adjust the flexible display 920 using the actuators 930. This provides the user with more control in determining the optimal viewing position for the flexible display 920 and allows the user to override the positioning of the flexible display 920 as determined by the display system 900, if desired.

Figure 14:
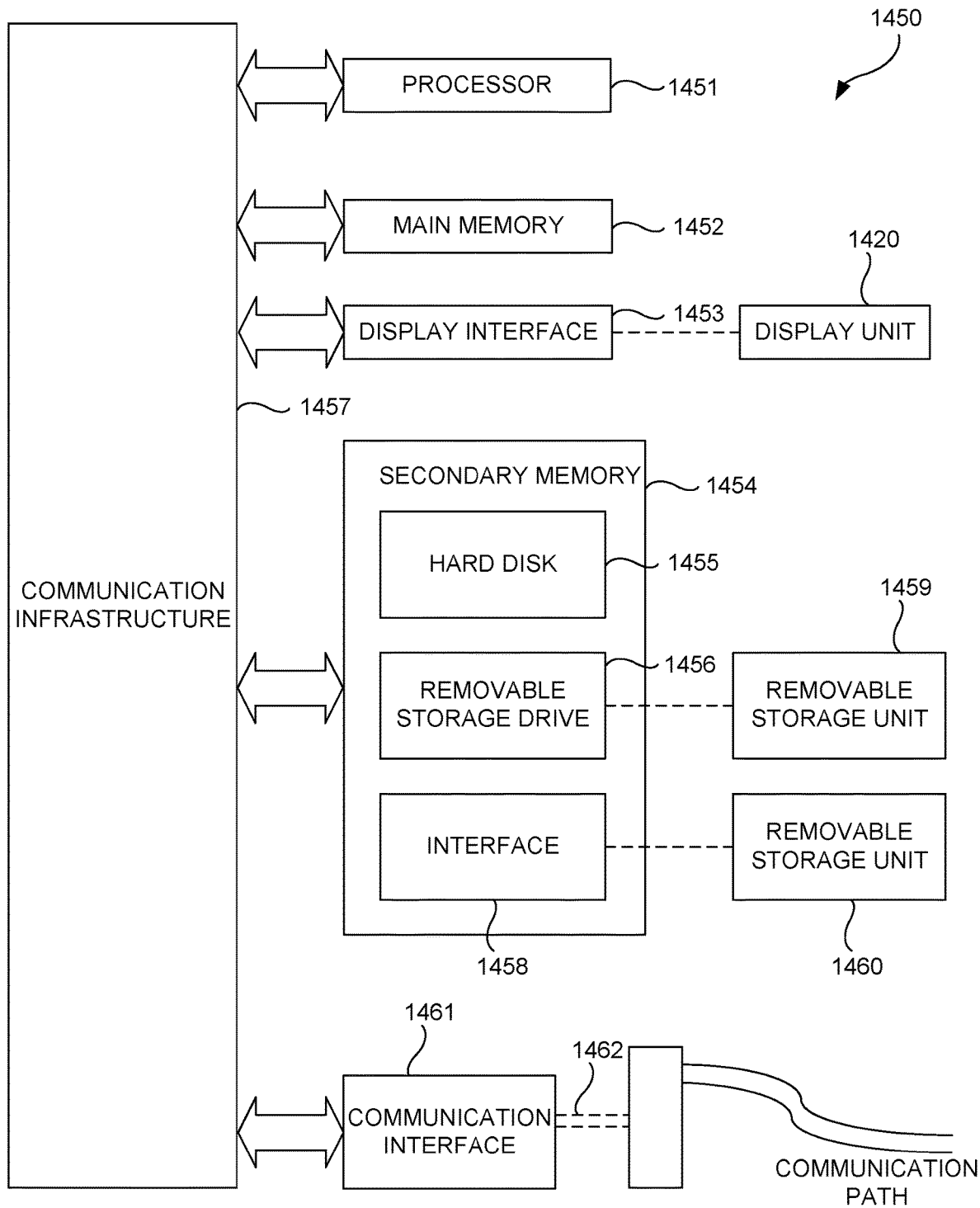
FIG. 14 is a schematic block diagram of an exemplary control unit in which embodiments may be implemented.

The display system 900 further includes a control unit 950 for managing operation of the display system 900. The embodiments described herein are not limited to a particular type of control unit 950. FIG. 14 illustrates an exemplary computer system 1450 in which embodiments, or portions thereof may be implemented as computer readable code. For example, collecting ambient light information, determining a bending direction and/or bending degree, and actuating the mechanical actuators may be implemented in a computer system 1450 using hardware, software, firmware, tangible computer readable media having instructions stored thereon, or a combination thereof and may be implemented in one or more computer systems or other processing systems. A control unit 950 discussed herein may be a computer system having all or some components of the computer system for implementing processes discussed herein. FIG. 14 shows an exemplary configuration of a control unit 1450 according to some embodiments.

Figure 13:
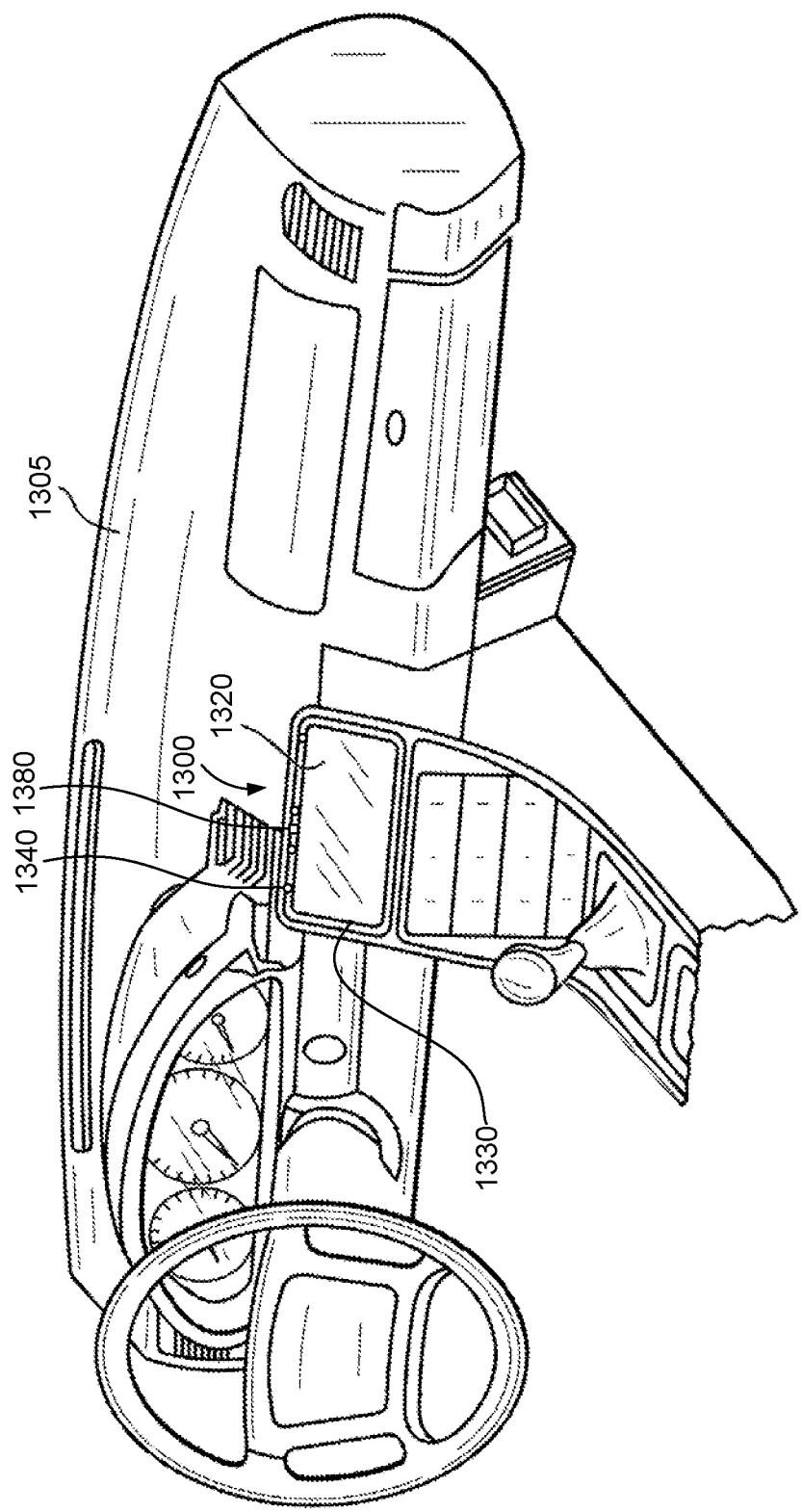
FIG. 13 is a perspective view of a vehicle interior with a vehicle display system according to some embodiments.

The control unit 950 may be in wired or wireless connection with the adjustable support 960. The control unit 950 may be programmed to automatically bend the flexible display 920 in a particular manner upon the occurrence of particular events. For example, when the display system is a vehicle display system (as shown in FIG. 13), the control unit 950 may bend the flexible display 920 from a storage configuration to an operational configuration upon starting the vehicle ignition and may automatically bend the flexible display 920 from the operational configuration to the storage configuration upon placing the vehicle in park or turning off the ignition. The control unit 950 may be in communication with one or more sensors for determining whether such conditions are met, such as a sensor to determine whether the vehicle's ignition is on or off. In some embodiments, the flexible display 920 is in a storage configuration when not in use, and may automatically bend into an operational configuration when in use, such as when the display system 900 detects the presence of a user nearby, or when a control or actuator is operated by a user.

In some embodiments, the control unit 950 may further cause the adjustable support 960 to bend the flexible display 920 based upon an input. The control unit 950 may receive an input by means of one or more sensors (e.g., photodetectors or location sensors) in communication with the control unit 950.

In some embodiments, the display system 900 includes a plurality of photodetectors 940, as shown in FIGS. 9-10. In such embodiments, the control unit 950 may cause the adjustable support 960 to bend the flexible display 920 based upon input received by the photodetectors 940, such as information about the amount, intensity or direction of ambient light detected at each of the plurality of photodetectors 940. The photodetector 940 may be a photodiode sensor or an optical sensor, such as a camera. In some embodiments, the photodetectors 940 may be embedded within the flexible display 920. In some embodiments, the flexible display 920 may itself serve as one or more photodetectors 940. For example, an organic light emitting diode (OLED) display may be configured to sense light if the OLED stack is negatively biased so as to form a photodiode. Further, a liquid crystal display (LCD) may be modified so as to include a thin-film-transistor (TFT) capable of sensing light. A plurality of pixels of the display 920 may serve as the photodetectors 940. In such embodiments, the pixels may detect ambient light in the time between addressing frames of an image or video shown on the display 920. In any of the various embodiments, the photodetectors 940 may be in wired or wireless communication with the control unit 950.

In some embodiments, the photodetectors 940 are positioned about a perimeter 922 of the flexible display 920. In this way, the photodetectors 940 are positioned so as to determine the amount and direction of ambient light at various portions of the flexible display 920. The photodetectors 940 may be positioned about the entire perimeter 922 of the flexible display 920 or only a portion of the perimeter 922. By positioning the photodetectors 940 about the entire perimeter 922 of the flexible display 920, the ambient light at various portions of the flexible display 920 can be used to determine the direction of the ambient light and further which portions of the flexible display 920 are receiving the highest amount or intensity of ambient light. The plurality of photodetectors 940 may be regularly positioned along the perimeter 922 of the flexible display 920. For example, the photodetectors 940 may be equally spaced from one another. The photodetectors 940 may alternatively or additionally be arranged in a pattern. For example, one photodetector 940 may be positioned at each corner of a square or rectangular shaped flexible display 920, and/or each edge of the flexible display 920 may have one photodetector 940 that is centrally positioned thereon.

In some embodiments, the photodetectors 940 are fixed to the flexible display 920. In this way, the position of the photodetectors 940 changes as the flexible display 920 bends, such that the photodetectors 940 can detect light based upon the position and configuration of the flexible display 920. In some embodiments, the photodetectors 940 may be disposed on a border 970 that extends along the perimeter 922 of the flexible display 920. In this way, the photodetectors 940 are secured to the flexible display 920 via the border 970. The border 970 may be composed of a flexible or bendable material so that the border 970 is capable of bending as the flexible display 920 bends. As the photodetectors 940 are attached to the flexible display 920 by the border 970, the position of the photodetectors 940 changes as the flexible display 920 bends.

The display system 900 is configured to dynamically adjust the flexible display 920 in response to ambient lighting conditions. In some embodiments, each of the plurality of photodetectors 940 detects an intensity and/or direction of ambient light at a different position on the flexible display 920. The control unit 950 receives information from the photodetectors 940 relating to the intensity and/or direction of ambient light and signals the adjustable support 960 to bend the flexible display 920 based upon the information from the photodetectors 940.

In some embodiments, the control unit 950 determines which photodetector or photodetectors 940 are receiving the highest intensity of ambient light. Based on this information, the control unit 950 determines a bending direction so as to bend the flexible display 920 away from the photodetector(s) receiving the highest intensity of light. The control unit 950 may bend the flexible display 920 to a predetermined degree in response to ambient light. Alternatively, the control unit 950 may further determine a bending degree that indicates how far to bend the flexible display 920 in the bending direction. The bending degree may be proportional to the intensity of ambient light detected such that the flexible display 920 is bent to a greater degree as the intensity of ambient light detected increases. For example, where the ambient light is of relatively low intensity, only a small degree of bending may be required to render the flexible display 920 viewable by a user. Where the ambient light is of a higher intensity, a greater degree of bending may be required to render the flexible display 920 viewable by a user.

In some embodiments, the photodetectors 940 detect a direction of ambient light. The control unit 950 may use the direction information to cause the adjustable support 960 to bend the flexible display 920. The control unit 950 may determine a bending direction so as to bend the flexible display 920 away from the direction of ambient light detected at the photodetectors 940. The control unit 950 may bend the flexible display 920 to a predetermined degree or may determine a bending degree and bend the flexible display 920 to a certain extent based on the ambient lighting conditions.

In the various embodiments described herein, the control unit 950 may bend the flexible display 920 so as to reduce the amount or intensity of ambient light detected by at least one of the plurality of photodetectors 940. In some embodiments, the control unit 950 may set a threshold intensity of ambient light below which no adjustment of the flexible display 920 is necessary for a user to view the flexible display 920. When ambient light intensity increases above the threshold intensity, the display system 900 may begin to automatically adjust the flexible display 920 so as to reduce the intensity of ambient light detected by at least one of the plurality of photodetectors 940. In some embodiments, in order to improve the visibility of the flexible display 920, the flexible display 920 may be adjusted until the intensity of ambient light is at or below the threshold intensity. Alternatively, the flexible display 920 may adjust until the intensity of ambient light is reduced by a predetermined amount. This may be preferable in high ambient lighting conditions where it may not be possible to adjust the flexible display 920 so as to reduce the intensity of ambient light below the threshold intensity. In some embodiments, the flexible display 920 may simply be adjusted in a predetermined fashion based upon the amount or intensity of ambient light originally detected. For example, in response to a photodetector 940 detecting ambient light above a threshold intensity, the display system 900 may automatically bend the flexible display 920 in a bending direction away from the photodetector 940 detecting the high intensity ambient light and bend the flexible display 920 to a predetermined degree.

In some embodiments, the control unit 950 is configured to display media on the flexible display 920, such as text, images, video, or a combination thereof. In response to ambient light detected by one or more of the photodetectors 940, the control unit 950 may reposition the media on the flexible display 920 so as to improve or optimize the visibility of the media. Thus, the control unit 950 may shift the media to a portion of the flexible display 920 away from a portion of the display 920 receiving a high amount or intensity of ambient light detected by one or more of the photodetectors 940. For example, if a high amount of ambient light is detected at a first portion of the display 920, the control unit 950 may shift the media shown on the display 920 to a second portion of the display 920 at which a lower amount or intensity of ambient light is detected. The control unit 950 may reposition the media on the flexible display 920 in addition to or as an alternative to bending the flexible display 920.

In some embodiments, the display system 900 further includes one or more location sensors 980. The location sensors 980 may be optical sensors. The location sensors 980 are configured to detect a location of a user. The location sensors 980 may detect the location of the user's body, or a location of a particular body part or portion of the user, such as the user's head or eyes. The one or more location sensors 980 may be operably connected to the control unit 950 such that the control unit 950 causes the adjustable support 960 to adjust the flexible display 920 based on the location of the user as determined by the location sensors 980.

The control unit 950 may adjust the flexible display 920 based upon information from the photodetectors 940 as well as from the location sensors 980. Thus, the control unit 950 may determine a location of the user based on the location sensors 980. The control unit 950 may adjust the flexible display 920 so as to orient the flexible display 920 towards the location of the user determined by the location sensors 980. In embodiments in which the flexible display 920 is able to tilt, the control unit 950 may tilt the flexible display 920 towards the location of the user. Further, as the photodetectors 940 detect ambient light at the flexible display 920, the control unit 950 may adjust the flexible display 920 so as to reduce glare at the location of the user or so as to otherwise optimize visibility of the flexible display 920 at the location of the user. Determining the location of the user may help to prevent the display from being adjusted so as to reduce glare or otherwise optimize viewing of the flexible display in such a manner that the flexible display is oriented away from the user.

For example, in embodiments in which the display system 900 is incorporated in a vehicle, such as an automobile, the location sensors 980 may determine that the user is located in the driver seat of the vehicle. As ambient light is detected at the plurality of photodetectors 940, the control unit 950 may cause the adjustable support to adjust the flexible display 920 so as to optimize the visibility of the flexible display 920 from the location of the user in the driver seat of the vehicle. Without the use of location sensors 980, the control unit 950 may, in some cases, determine that the intensity of ambient light can be reduced to the greatest extent by orienting the flexible display 920 towards the passenger seat of the vehicle, which would be undesirable for the user seated in the driver seat of the vehicle.

Further, as the control unit 950 may receive information from the photodetectors 940 relating to the direction of ambient light, the control unit 950 may adjust the flexible display 920 so that the flexible display 920 does not reflect the ambient light towards the location of the user as determined by the location sensor(s) 980. This may help to reduce or eliminate glare on the display 920 that results from ambient light being directed toward the user. The control unit 950 may bend or tilt the display 920 such that the reflected light is directed away from the location of the user.

Figure 11:
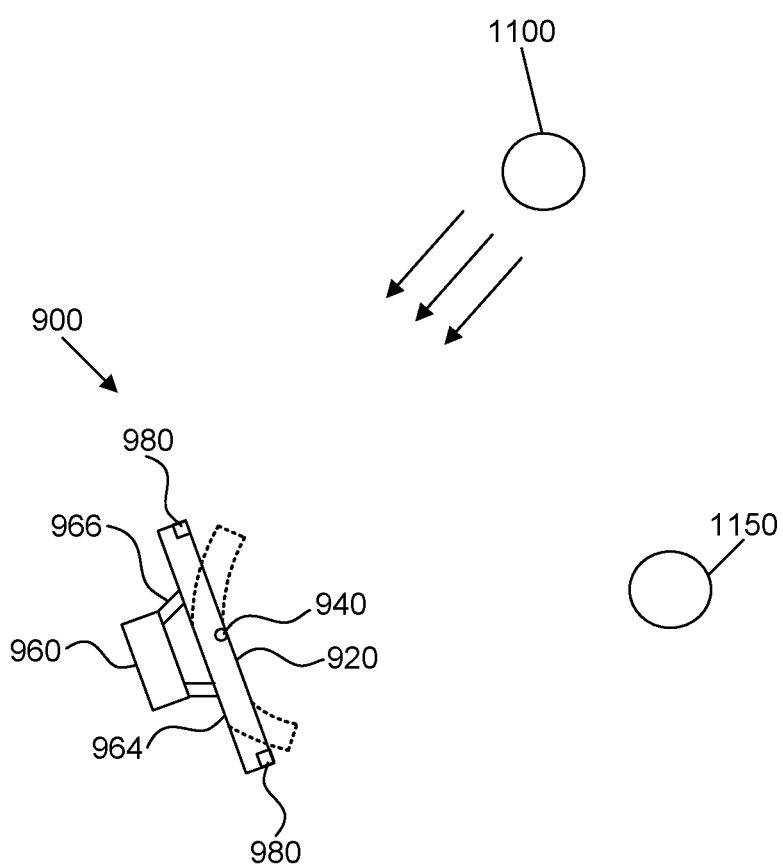
FIG. 11 illustrates the operation of a display system according to some embodiments.

In an exemplary operation of a display system 900 according to some embodiments, a user 1150 is positioned so as to view a flexible display 920 of the display system 900, as shown in FIG. 11. A light source 1100, such as the sun, serves as a source of ambient light. A plurality of photodetectors 940 positioned about a perimeter of the display 920 detects the ambient light at each photodetector 940 position. The control unit 950 determines whether the ambient light intensity is above a threshold intensity such that adjustment of the display 920 is required. In response to ambient light above the threshold intensity, the control unit 950 of the display system 900 may determine a bending direction in which to bend the flexible display 920 to reduce ambient light detected at one or more of the photodetectors 940. The control unit 950 may further determine a bending degree, i.e., the extent to which the flexible display 920 will be bent in the bending direction. The control unit 950 can cause the adjustable support 960 to bend and/or tilt the flexible display 920 so as to reduce the ambient light detected by at least one of the photodetectors 940. In embodiments having location sensors 980, the control unit 950 may optimize the visibility of the flexible display 920 from the perspective of the user's location as determined by the location sensors 980. Thus, the control unit 950 may serve to tilt and/or bend the flexible display 920 to reduce the intensity of ambient light with the display 920 oriented towards the user's location.

Figure 12A:
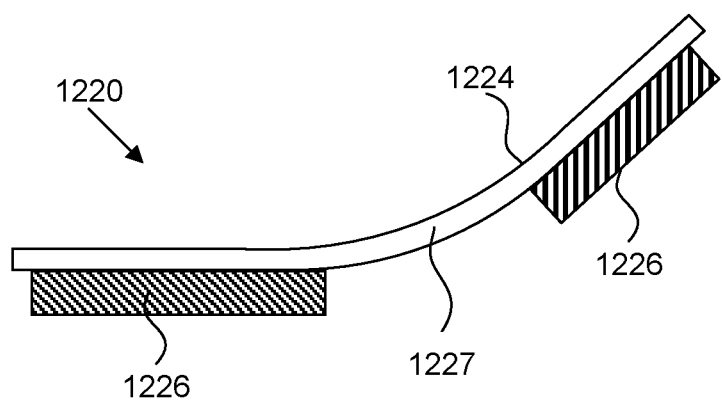
FIG. 12A is a top down view of a flexible display including two display modules according to some embodiments.

While in some embodiments, the flexible display includes a glass substrate and a display module, in other embodiments as shown in FIG. 12A, the flexible display 1220 may include a glass substrate 1224 and two or more display modules 1226. In FIG. 12A, the flexible display 1220 includes a glass substrate 1224 positioned so as to cover two or more display modules 1226. The glass substrate 1224 may have any of various shapes, such as a square, rectangular, circular, L-shape, V-shape, or J-shape, among others. In some embodiments, the display modules 1226 may be arranged in a side-by-side manner, such that the display modules 1226 are arranged linearly in a single row or column. A single glass substrate 1224 is positioned such that a major surface of the glass substrate 1224 is in contact with a surface of each display module 1226. Each display module 1226 may be independently positionable, and may be capable of pivoting or tilting relative to the other display module(s) 1226. For example, in an embodiment having two display modules 1226 arranged linearly, one or both display modules 1226 can be tilted, such that the display modules 1226 form an L-shape or V-shape, in order to adjust the viewing position of the display module(s) 1226. As the display modules 1226 tilt, the glass substrate 1224 covering the display modules 1226 bends in a corresponding manner while the display modules 1226 retain their configuration (i.e., without bending of the display modules). In some embodiments, display modules 1226 may be flexible and are capable of bending with glass substrate 1224. The glass substrate 1224 may bend about a bending axis extending on or parallel to a surface of glass substrate 1224 at a central portion 1227 of the glass substrate 1224 located between the display modules 1226 such that the portions of the glass substrate 1224 covering the display modules 1226 do not bend. In such embodiments, the display modules 1226 may be tilted by means of an adjustable support and control unit as described herein.

Figure 12B:
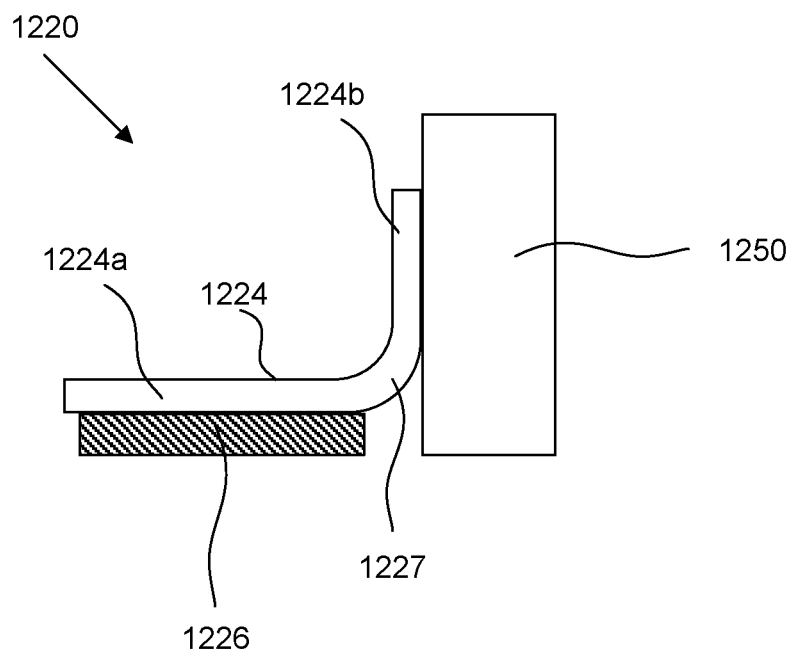
FIG. 12B is a top down view of a flexible display having a display module and mounted on a support surface according to some embodiments.

In some embodiments, as shown in FIG. 12B, a portion of the flexible display is affixed to a support structure. In FIG. 12B, the flexible display 1220 includes a glass substrate 1224 and a display module 1226. A first portion 1224a of the glass substrate 1224 is positioned so as to cover the display module 1226, such that a major surface of the glass substrate 1224 is in contact with a surface of the display module 1226. A second portion 1224b of the glass substrate 1224 is affixed to a support structure 1250. The support structure 1250 may be any of various structures to which it may be desirable to mount a flexible display, including a portion of a vehicle, such as a center console, steering wheel, or dashboard, a building structure, such as a wall, floor, ceiling or countertop, or a free-standing structure, such as a podium, a table, a housing, or the like. The second portion 1224b of the glass substrate can be affixed to the support structure 1250 by any of various means, such as by the use of mechanical fasteners, adhesives or epoxies, or brackets, among others fastening methods. A central portion 1227 of the glass substrate can bend so as to allow the flexible display 1220 to be variously positioned relative to the support structure 1250. In this way, the flexible display 1220 may be moved between a storage configuration in which the flexible display 1220 is alongside or, in some embodiments, withdrawn within the support structure 1250, and an operational configuration in which the flexible display 1220 is extended from the support structure 1250 so that it is more readily viewed. The flexible display 1220 may be moved between the storage and operational configuration by means of an adjustable support and control unit as described herein.

In some embodiments, the display system is used as a vehicle display system 1300, as shown for example in FIG. 13. The vehicle display system 1300 can be incorporated into vehicles such as trains, automobiles (e.g., cars, trucks, buses and the like), seacraft (e.g., boats, ships, submarines, and the like), and aircraft (e.g., drones, airplanes, jets, helicopters and the like), including both human-piloted vehicles, semi-autonomous vehicles and fully autonomous vehicles. The vehicle display system 1300 includes a vehicle base 1305, such as a center console, a dashboard, or a steering wheel of a vehicle. In other embodiments, the vehicle base 1305 may include various other vehicle portions, such as an arm rest, a pillar, a seat back, a floor board, a headrest, a door panel, or any portion of the interior of a vehicle.

The vehicle display system 1300 may be integrated with the electronics and/or power system of the vehicle, or the vehicle display system 1300 may be separate therefrom. The flexible display 1320 may be manufactured as part of the vehicle or may be retrofitted. A flexible display 1320, of the type described herein, is mounted on an adjustable support which is mounted on the vehicle base 1305. A rear surface of the flexible display 1320 may be in contact with the adjustable support such that a front, user-facing surface of the flexible display 1320 faces the vehicle interior so that an image on the flexible display 1320 can be viewed by vehicle occupants. The flexible display 1320 may be positioned so as to form a portion of the vehicle base 1305 and may follow the shape and contour thereof. The flexible display 1320 may be extended from the vehicle base 1305 when the vehicle is in use, such that the flexible display 1320 moves into an operating position in which it is more easily viewed by a user, such as a driver, and no longer follows the shape and contour of the vehicle base 1305.

The vehicle display system 1300, as shown in FIG. 13, is incorporated into a vehicle base 1305 that is a center console. The flexible display 1320 can have any of the constructions as described herein, and may include a glass substrate, such as a cold-bent glass substrate, and a display module, which may include a backlight unit and a second glass substrate. Photodetectors 1340 are located about the perimeter of the flexible display 1320, for example, on or in a border 1330 of the flexible display 1320. Further, one or more location sensors 1380 may be integrated into the display system 1300. The location sensors 1380 may also be positioned about a perimeter of the flexible display 1320, for example on or in the border 1330 on or in which the photodetectors 1340 are positioned. The photodetectors 1340 and the location sensors 1380 are operably connected to a control unit (e.g., control unit 950). The location sensors 1380 may determine whether a user is in the vehicle, and further a location of users within the vehicle.

When a user is a driver in the driver seat of the vehicle, the location sensor 1380 may detect the presence and location of the driver and optimize viewing of the flexible display 1320 from the location of the driver. Upon detecting ambient light of sufficient intensity, the flexible display 1320 may tilt and/or bend so as to reduce the intensity of ambient light detected at one or more of the photodetectors 1340, and may tilt or bend to avoid directing light towards the user, so as to reduce or eliminate glare. In this way, the display system 1300 helps to improve or optimize the visibility of the display 1320 in response to ambient lighting conditions and without intervention by the user.

FIG. 14 illustrates an exemplary computer system 1450 in which embodiments, or portions thereof, may be implemented as computer-readable code. For example, collection of ambient light data (i.e., data from photodetectors), location sensor data, and/or determining a bending and/or tilting direction may be implemented in computer system 1450 using hardware, software, firmware, tangible computer readable media having instructions stored thereon, or a combination thereof and may be implemented in one or more computer systems or other processing systems. Control units discussed herein may be computer systems having all or some of the components of computer system 1450 for implementing processes discussed herein.

If programmable logic is used, such logic may execute on a commercially available processing platform or a special purpose device. One of ordinary skill in the art may appreciate that embodiments of the disclosed subject matter can be practiced with various control unit configurations, including multi-core processor systems, minicomputers, and mainframe computers, computer linked or clustered with distributed functions, as well as pervasive or miniature computers that may be embedded into virtually any device.

For instance, at least one processor device and a memory may be used to implement the above described embodiment. A processor device may be a single processor, a plurality of processors, or combinations thereof. Processor devices may have one or more processor "cores."

Various embodiments may be implemented in terms of this exemplary computer system. After reading this description, it will become apparent to a person skilled in the relevant art how to implement one or more of the embodiments using other computer systems or architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 1451 may be a special purpose or a general purpose processor device. As will be appreciated by persons skilled in the relevant art, processor device 1451 may also be a single processor in a multi-core/multiprocessor system, such system operating alone, or in a cluster of computing devices operating in a cluster or server farm. Processor device 1451 is connected to a communication infrastructure 1457, for example, a bus, message queue, network, or multi-core message-passing scheme.

Computer system 1450 also includes a main memory 1452, for example, random access memory (RAM), and may also include a secondary memory 1454. Secondary memory 1454 may include, for example, a hard disk drive 1455, or removable storage drive 1456. Removable storage drive 1456 may include a floppy disk drive, a magnetic tape drive, an optical disk drive, a flash memory, or the like. The removable storage drive 1456 reads from and/or writes to a removable storage unit 1459 in a well-known manner. Removable storage unit 1459 may include a floppy disk, magnetic tape, optical disk, a universal serial bus (USB) drive, etc. which is read by and written to by removable storage drive 1456. As will be appreciated by persons skilled in the relevant art, removable storage unit 1459 includes a computer usable storage medium having stored therein computer software and/or data.

Computer system 1450 (optionally) includes a display interface 1453 (which can include input and output devices such as a keyboard) that forwards graphics, text, and other data from communication infrastructure 1457 (or from a frame buffer, not shown) for display on display 1420.

In alternative implementations, secondary memory 1454 may include other similar means for allowing computer programs or other instructions to be loaded into computer system 1450. Such means may include, for example, a removable storage unit 1460 and an interface 1458. Examples of such means may include a program cartridge and cartridge interface (such as that found in video game devices), a removable memory chip (such as an EPROM, or PROM) and associated socket, and other removable storage units 1460 and interfaces 1458 which allow software and data to be transferred from the removable storage unit 1460 to computer system 1450.

Computer system 1450 may also include a communication interface 1461. Communication interface 1461 allows software and data to be transferred between computer system 1450 and external devices. Communication interface 1461 may include a modem, a network interface (such as an Ethernet card), a communication port, a PCMCIA slot and card, or the like. Software and data transferred via communication interface 1461 may be in the form of signals, which may be electronic, electromagnetic, optical, or other signals capable of being received by communication interface 1461. These signals may be provided to communication interface 1461 via a communication path 1462. Communication path 1462 carries signals and may be implemented using wire or cable, fiber optics, a phone line, a cellular phone link, an RF link or other communication channels.

As used herein, the terms "computer program medium" and "computer usable medium" are used to generally refer to media such as removable storage unit 1459, removable storage unit 1460, and a hard disk installed in hard disk drive 1455. Computer program medium and computer usable medium may also refer to memories, such as main memory 1452 and secondary memory 1454, which may be memory semiconductors (e.g. DRAMs, etc.).

Computer programs (also called computer control logic) are stored in main memory 1452 and/or secondary memory 1454. Computer programs may also be received via communication interface 1461. Such computer programs, when executed, enable computer system 1450 to implement the embodiments as discussed herein. In particular, the computer programs, when executed, enable processor device 1451 to implement the processes of the embodiments discussed herein. Where the embodiments are implemented using software, the software may be stored in a computer program product and loaded into computer system 1450 using removable storage drive 1456, interface 1458, and hard disk drive 1455, or communication interface 1461.

Embodiments of the invention(s) also may be directed to computer program products comprising software stored on any computer usable medium. Such software, when executed in one or more data processing devices, causes a data processing device to operate as described herein. Embodiments may employ any computer useable or readable medium. Examples of computer useable medium include, but are not limited to, primary storage devices (e.g., any type of RAM), secondary storage devices (e.g., hard drives, floppy disks, CD ROMS, ZIP disks, tapes, magnetic storage devices, optical storage devices, MEMS, nanotechnological storage devices, etc.).

Aspect (1) pertains to a dynamically adjustable display system, comprising: a flexible display that is capable of reversibly bending along one or more bending axes; an adjustable support on which the flexible display is mounted, wherein the adjustable support is configured to selectively bend the flexible display; a plurality of photodetectors positioned about a perimeter of the flexible display for detecting ambient light; and a control unit in communication with the adjustable support and the plurality of photodetectors, wherein the control unit causes the adjustable support to bend the flexible display in response to ambient light detected at the plurality of photodetectors.

Aspect (2) pertains to the display system of Aspect (1), wherein the flexible display comprises a cold-bent glass substrate.

Aspect (3) pertains to the display system of Aspect (2), wherein the flexible display further comprises a display module attached to a surface of the cold-bent glass substrate.

Aspect (4) pertains to the display system of Aspect (3), wherein the display module comprises a second glass substrate and a backlight unit, wherein the second glass substrate is disposed adjacent to the cold-bent glass substrate and between the backlight unit and the cold-bent glass substrate.

Aspect (5) pertains to the display system of Aspect (3) or (4), wherein the display module comprises an organic light emitting diode display.

Aspect (6) pertains to the display system of any one of Aspects (1) through (5), wherein the flexible display comprises a border positioned on and extending along the perimeter of the flexible display, and wherein the plurality of photodetectors are positioned on the border.

Aspect (7) pertains to the display system of any one of Aspects (1) through (6), wherein the control unit is configured to determine a bending direction and a bending degree based upon ambient light detected at the plurality of photodetectors.

Aspect (8) pertains to the display system of any one of Aspects (1) through (7), wherein the flexible display is capable of bending into a concave configuration or a convex configuration.

Aspect (9) pertains to the display system of any one of Aspects (1) through (8), wherein the adjustable support comprises one or more mechanical actuators configured to selectively bend the flexible display.

Aspect (10) pertains to the display system of any one of Aspects (1) through (9), wherein the control unit is configured to cause the adjustable support to bend the flexible display so as to reduce an intensity of ambient light detected by at least one of the plurality of photodetectors.

Aspect (11) pertains to the display system of any one of Aspects (1) through (10), further comprising one or more location sensors configured to detect a location of a user, wherein the control unit further causes the adjustable support to adjust the flexible display based on the location of the user.

Aspect (12) pertains to the display system of Aspect (11), wherein the control unit is configured to adjust the flexible display so as to orient the flexible display towards the location of the user as determined by the one or more location sensors.

Aspect (13) pertains to a method for dynamically adjusting a flexible display, the method comprising: detecting an intensity of ambient light at each of a plurality of photodetectors, wherein the plurality of photodetectors are positioned about a perimeter of a flexible display; and bending the flexible display based upon the intensity of ambient light detected at the plurality of photodetectors so as to reduce the intensity of ambient light detected by at least one of the plurality of photodetectors.

Aspect (14) pertains to the method of Aspect (13), further comprising determining a bending direction in which to bend the flexible display based upon the intensity of ambient light detected at each of the plurality of photodetectors.

Aspect (15) pertains to the method of Aspect (13) or Aspect (14), further comprising determining a bending degree to which to bend the flexible display based upon the intensity of ambient light detected at the plurality of photodetectors.

Aspect (16) pertains to the method of any one of Aspects (13) through (15), further comprising tilting the flexible display based upon the intensity of ambient light detected at the plurality of photodetectors so as to reduce the intensity of ambient light detected by at least one of the plurality of photodetectors.

Aspect (17) pertains to the method of any one of Aspects (13) through (16), further comprising bending the flexible display based upon a location of a user as determined by one or more location sensors.

Aspect (18) pertains to a vehicle display system for dynamically adjusting a flexible display based upon ambient lighting conditions, the vehicle display system comprising: a vehicle base; an adjustable support disposed on the vehicle base, a flexible display mounted on the adjustable support such that a rear surface of the flexible display is in contact with the adjustable support and a front surface of the flexible display allows for an image on the flexible display to be viewed by a user; a plurality of photodetectors positioned about a perimeter of the flexible display for detecting ambient light; and a control unit in communication with the adjustable support and the plurality of photodetectors, wherein the control unit receives ambient light information from the plurality of photodetectors and causes the adjustable support to bend the flexible display in response to the ambient light information.

Aspect (19) pertains to the vehicle display system of Aspect (18) wherein the vehicle base comprises a center console, a dashboard, or a steering wheel.

Aspect (20) pertains to the vehicle display system of Aspect (18) or Aspect (19), wherein the flexible display comprises a display module attached to a surface of a cold-bent glass substrate.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

The term "or," as used herein, is inclusive; more specifically, the phrase "A or B" means "A, B, or both A and B." Exclusive "or" is designated herein by terms such as "either A or B" and "one of A or B," for example.

The indefinite articles "a" and "an" to describe an element or component means that one or at least one of these elements or components is present. Although these articles are conventionally employed to signify that the modified noun is a singular noun, as used herein the articles "a" and "an" also include the plural, unless otherwise stated in specific instances. Similarly, the definite article "the," as used herein, also signifies that the modified noun may be singular or plural, again unless otherwise stated in specific instances.

As used in the claims, "comprising" is an open-ended transitional phrase. A list of elements following the transitional phrase "comprising" is a non-exclusive list, such that elements in addition to those specifically recited in the list may also be present. As used in the claims, "consisting essentially of" or "composed essentially of" limits the composition of a material to the specified materials and those that do not materially affect the basic and novel characteristic(s) of the material. As used in the claims, "consisting of" or "composed entirely of" limits the composition of a material to the specified materials and excludes any material not specified.

The term "wherein" is used as an open-ended transitional phrase, to introduce a recitation of a series of characteristics of the structure.

Where a range of numerical values is recited herein, comprising upper and lower values, unless otherwise stated in specific circumstances, the range is intended to include the endpoints thereof, and all integers and fractions within the range. It is not intended that the scope of the claims be limited to the specific values recited when defining a range. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed. Finally, when the term "about" is used in describing a value or an end-point of a range, the disclosure should be understood to include the specific value or end-point referred to. Whether or not a numerical value or end-point of a range recites "about," the numerical value or end-point of a range is intended to include two embodiments: one modified by "about," and one not modified by "about."

As used herein, the term "about" means that amounts, sizes, ranges, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

The present embodiment(s) have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

It is to be understood that the phraseology or terminology used herein is for the purpose of description and not of limitation. The breadth and scope of the present disclosure should not be limited by any of the above-described exemplary embodiments, but should be defined in accordance with the following claims and their equivalents.

What is claimed is:

1. A dynamically adjustable display system, comprising:
a flexible display comprising a cold-bent glass substrate that is capable of reversibly bending along one or more bending axes;
an adjustable support on which the flexible display is mounted, wherein the adjustable support is configured to selectively bend the flexible display;
a plurality of photodetectors positioned about a perimeter of the flexible display for detecting ambient light;
a control unit in communication with the adjustable support and the plurality of photodetectors, wherein the control unit causes the adjustable support to bend the flexible display in response to ambient light detected at the plurality of photodetectors; and
one or more location sensors configured to detect a location of a user, wherein the control unit further causes the adjustable support to adjust the flexible display based on the location of the user, wherein the control unit is configured to adjust the flexible display so as to orient the flexible display towards the location of the user as determined by the one or more location sensors.

2. The display system of claim 1, wherein the flexible display further comprises a display module attached to a surface of the cold-bent glass substrate.

3. The display system of claim 2, wherein the display module comprises a second glass substrate and a backlight unit, wherein the second glass substrate is disposed adjacent to the cold-bent glass substrate and between the backlight unit and the cover glass substrate, wherein the second glass substrate is curved such that a surface thereof that is adjacent to the cold-bent glass substrate exhibits a radius of curvature that is within 10% of a second radius of curvature exhibited by the cold-bent glass substrate.

4. The display system of claim 2, wherein the display module comprises an organic light emitting diode display.

5. The display system of claim 1, wherein the flexible display comprises a border positioned on and extending along the perimeter of the flexible display, and wherein the plurality of photodetectors are positioned on the border.

6. The display system of claim 1, wherein the control unit is configured to determine a bending direction and a bending degree based upon ambient light detected at the plurality of photodetectors.

7. The display system of claim 1, wherein the flexible display is capable of bending into a concave configuration or a convex configuration.

8. The display system of claim 1, wherein the adjustable support comprises one or more mechanical actuators configured to selectively bend the flexible display.

9. The display system of claim 1, wherein the control unit is configured to cause the adjustable support to bend the flexible display so as to reduce an intensity of ambient light detected by at least one of the plurality of photodetectors.

10. The display system of claim 1, wherein the cold-bent glass substrate comprises:
an asymmetric surface stress distribution between major surfaces thereof; and
one or more surface treatments on at least one of the major surfaces, the one or more surface treatments comprising one or more of an anti-glare surface and an anti-reflective coating stack.

11. The display system of claim 10, wherein the cold-bent glass substrate comprises a length of greater than or equal to 20 cm and less than or equal to 250 cm and a width of greater than or equal to 20 cm and less than or equal to 250 cm.

12. The display system of claim 1, wherein, when the flexible display is bent via the adjustable support, at least one portion of the cold-bent glass substrate does not bend.

13. A method for dynamically adjusting a flexible display, the method comprising:
detecting an intensity of ambient light at each of a plurality of photo detectors, wherein the plurality of photodetectors are positioned about a perimeter of a flexible display; and
bending the flexible display based upon the intensity of ambient light detected at the plurality of photodetectors so as to reduce the intensity of ambient light detected by at least one of the plurality of photo detectors.

14. The method of claim 13, further comprising determining a bending direction in which to bend the flexible display based upon the intensity of ambient light detected at each of the plurality of photodetectors.

15. The method of claim 13, further comprising determining a bending degree to which to bend the flexible display based upon the intensity of ambient light detected at the plurality of photodetectors.

16. The method of claim 13, further comprising tilting the flexible display based upon the intensity of ambient light detected at the plurality of photodetectors so as to reduce the intensity of ambient light detected by at least one of the plurality of photodetectors.

17. The method of claim 13, further comprising bending the flexible display based upon a location of a user as determined by one or more location sensors.

18. The method of claim 13, wherein the bending the flexible display comprises bending a cold-formed glass substrate of the flexible display, the cold-formed glass substrate covering multiple display modules of the flexible display.

19. A vehicle display system for dynamically adjusting a flexible display based upon ambient lighting conditions, the vehicle display system comprising:
a vehicle base;
an adjustable support disposed on the vehicle base, a flexible display mounted on the adjustable support such that a rear surface of the flexible display is in contact with the adjustable support and a front surface of the flexible display allows for an image on the flexible display to be viewed by a user, wherein the flexible display comprises a cold-bent glass substrate;
a plurality of photodetectors positioned about a perimeter of the flexible display for detecting ambient light; and
a control unit in communication with the adjustable support and the plurality of photodetectors, wherein the control unit receives ambient light information from the plurality of photodetectors and causes the adjustable support to bend the flexible display in response to the ambient light information;
wherein the cold-bent glass substrate comprises: an asymmetric surface stress distribution between major surfaces thereof; and one or more surface treatments on at least one of the major surfaces, the one or more surface treatments comprising one or more of an anti-glare surface and an anti-reflective coating stack.

* * * * *